United States Patent [19]

Gillard

[11] Patent Number: 5,005,078
[45] Date of Patent: Apr. 2, 1991

[54] MOTION DEPENDENT VIDEO SIGNAL PROCESSING

[75] Inventor: Clive H. Gillard, Chineham, United Kingdom

[73] Assignee: Sony Corporation, Tokyo, Japan

[21] Appl. No.: 513,426

[22] Filed: Apr. 20, 1990

[30] Foreign Application Priority Data

Apr. 27, 1989 [GB] United Kingdom ............... 8909645

[51] Int. Cl.⁵ ........................................... H04N 7/01
[52] U.S. Cl. ..................................... 358/140; 358/105
[58] Field of Search ............... 358/140, 105, 133, 136

[56] References Cited

U.S. PATENT DOCUMENTS

| 4,862,259 | 8/1989 | Gillard | 358/140 |
| 4,873,573 | 10/1989 | Thomas | 358/133 |
| 4,890,160 | 12/1989 | Thomas | 358/105 |
| 4,942,466 | 7/1990 | Sandbank | 358/133 |

FOREIGN PATENT DOCUMENTS

| 0187641 | 7/1986 | European Pat. Off. |
| 2172171 | 9/1986 | United Kingdom . |
| 2188510 | 9/1987 | United Kingdom . |
| 2205706 | 12/1988 | United Kingdom . |

OTHER PUBLICATIONS

IEEE Transactions on Communications, vol. Com-35, No. 10, Oct. 1987, pp. 1069-1082, H. Yamaguchi, T. Sugi and K. Kinuhata, "Movement-Compensated Frame-Frequency Conversion of Television Signals".

Primary Examiner—Howard W. Britton
Attorney, Agent, or Firm—Alvin Sinderbrand; William S. Frommer

[57] ABSTRACT

In, for example, a motion compensated video standards converter blocks in a first field or frame of a video signal are each compared in a gate array with a plurality of blocks in the following field or frame of the video signal for deriving motion vectors representing the motion of the content of respective blocks between the first field or frame and the following field or frame, a correlation surface is generated for respective blocks in the first field or frame, the correlation surface representing the difference between the content of the block in the first field or frame and the content of each block in the following field or frame with which it has been compared, and the motion vectors are derived in dependence on a minimum in the correlation surface.

8 Claims, 19 Drawing Sheets

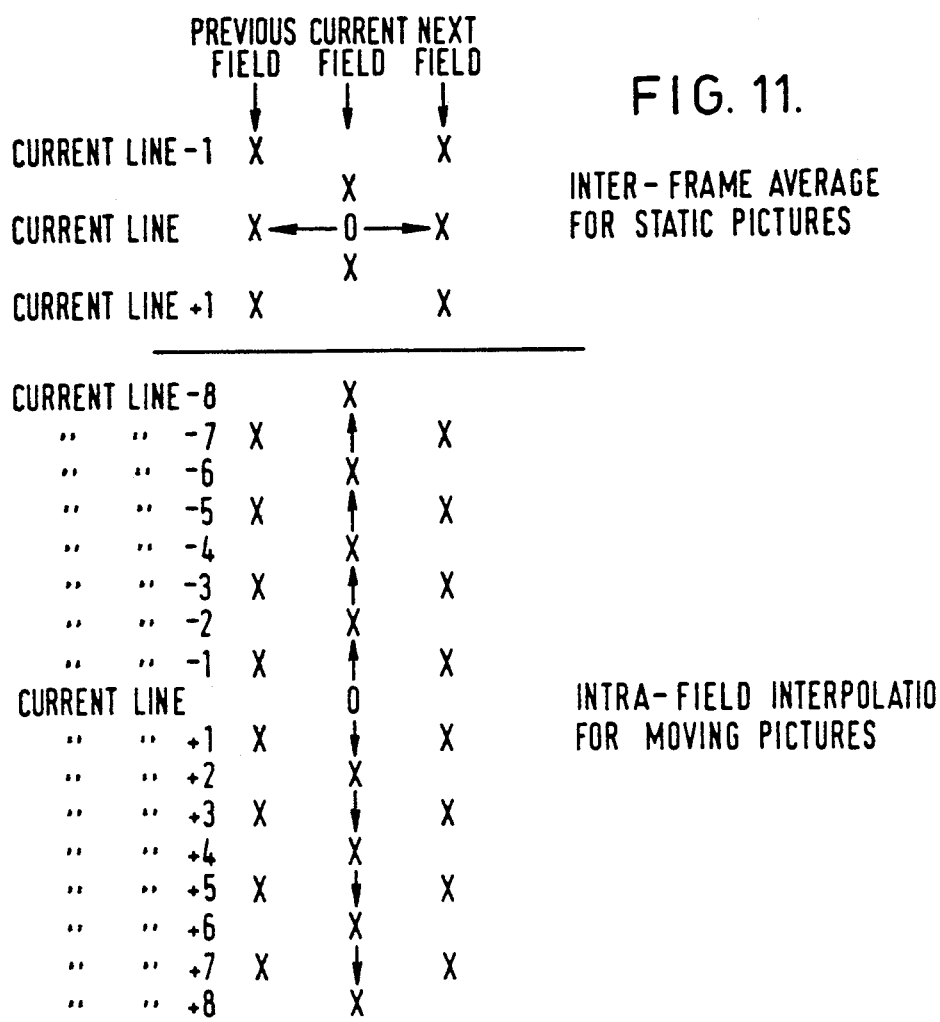
FIG. 11.
INTER-FRAME AVERAGE FOR STATIC PICTURES
INTRA-FIELD INTERPOLATION FOR MOVING PICTURES
FIG. 12A.
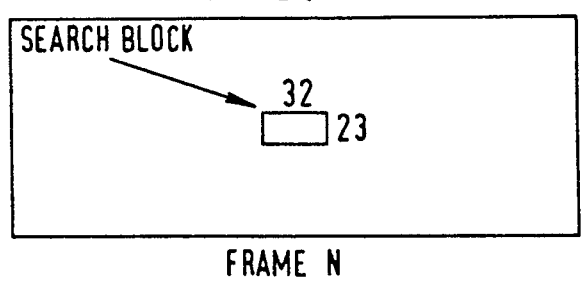
FRAME N
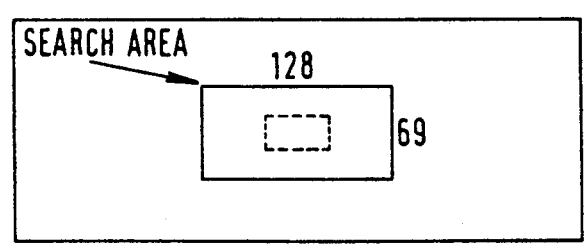
FRAME (N+1)
FIG. 12B.

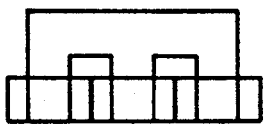
FIG.19A.
SEARCH BLOCK 3A
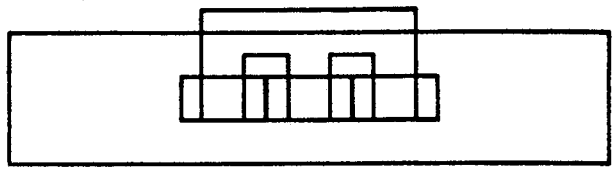
FIG.19B.
SEARCH AREA
FIG.20.
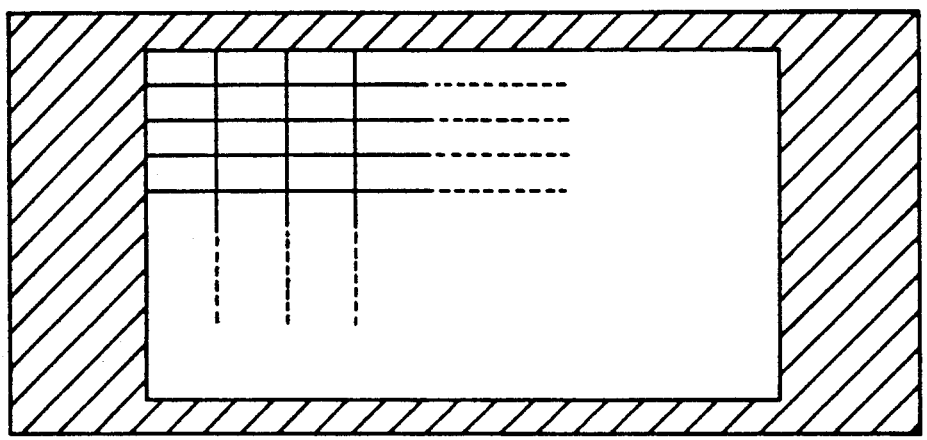
FIG.21A.
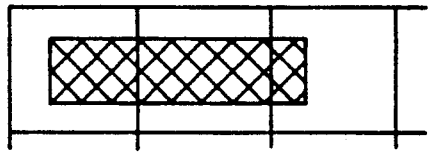
SEARCH BLOCKS.
FRAME (t)
MOTION (5,0)
FIG.21B.
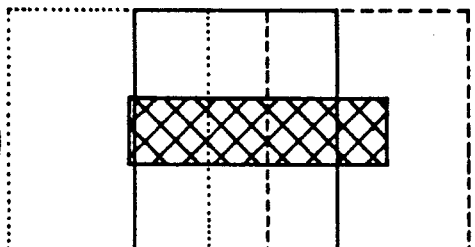
FRAME (t+1)
1B  2B  3B
SEARCH AREAS.

FIG. 31.
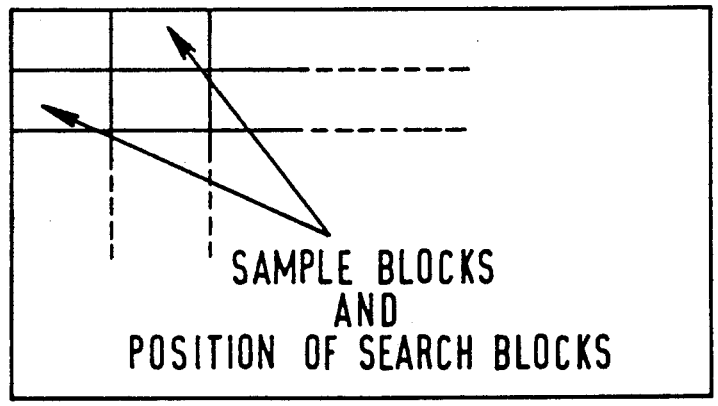
FIG. 32.
| C | C | C | C | C | C | | | | |
|---|---|---|---|---|---|---|---|---|---|
| C | C | B | B | B | B | | | | |
| C | C | B | A | A | A | | | | |
| C | C | B | A | A | A | | | | |
| C | C | B | A | A | A | | | | |
| C | C | B | A | A | A | | | | |
FIG. 33.
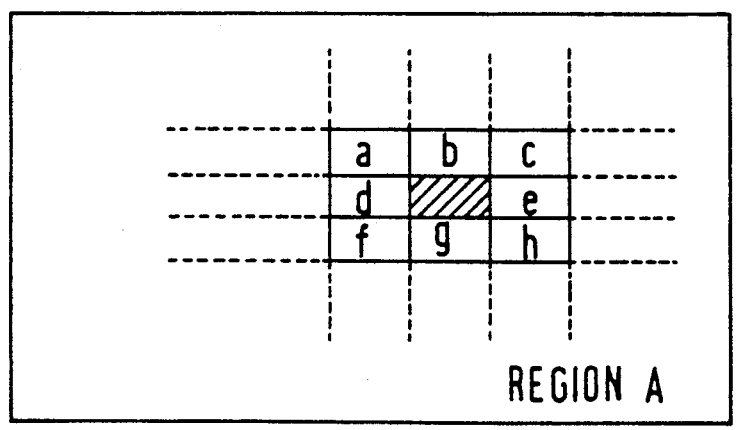
REGION A

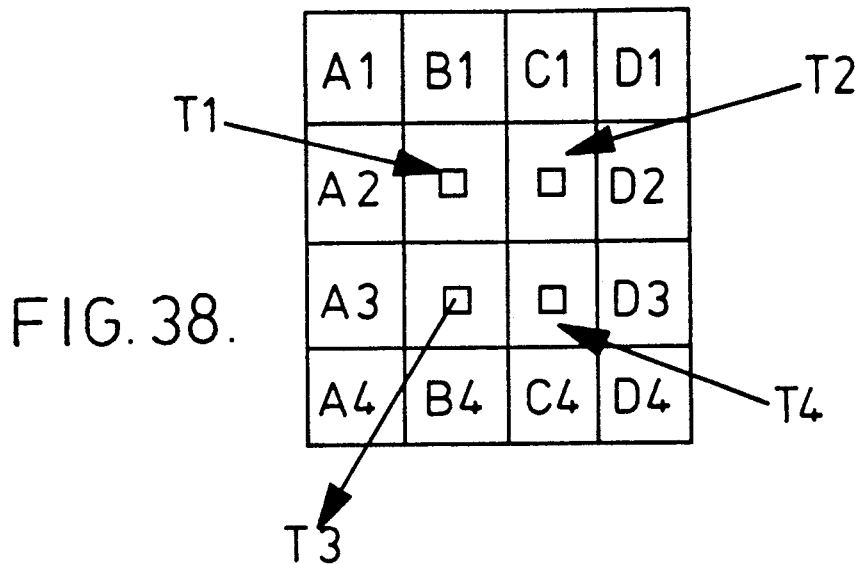
FIG. 38.
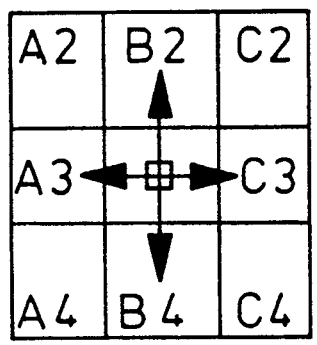
FIG. 39.
FIG. 40.
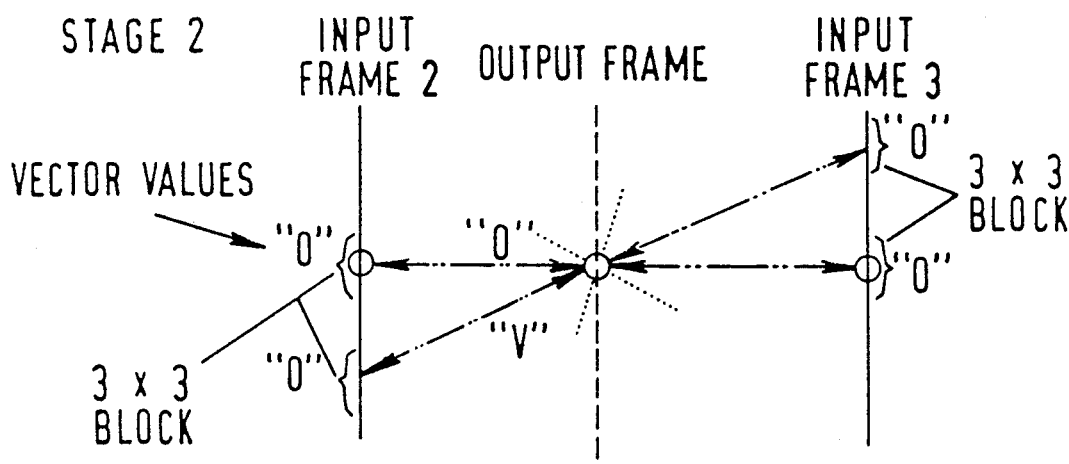

LEGEND △ = PIXEL VECTOR A
5 = VECTOR UNDER TEST

NO UNCOVERED OR
COVERED SUFACES

COVERED SUFACE

UNCOVERED SUFACE

MOTION DEPENDENT VIDEO SIGNAL PROCESSING

Attention is drawn to the fact that this application is one of a series of fourteen filed on the same day, and bearing Ser. Nos. 07/511,739; 07/511,740; 07/511,799; 07/512,145; 07/512,253; 07/512,262; 07/512,263; 07/512,278; 07/512,279; 07/512,381; 07/512,813; 07/513,086; 07513,087; and 07/513,426. These applications all relate to similar subject matter, and the disclosure in each is incorporated by this reference into each other.

BACKGROUND OF THE INVENTION

1. Field of the Invention

This invention relates to motion dependent video signal processing. More particularly, the invention relates to video standards converters using such signal processing, and to methods of deriving motion vectors representing motion between fields or frames of a video signal.

2. Description of the Prior Art

Video standards converters are well known devices used to convert video signals from one standard to another, for example, from a 625 lines per frame, 50 fields per second standard to a 525 lines per frame, 60 fields per second standard. Video standards conversion cannot be achieved satisfactorily merely by using simple linear interpolation techniques, because of the temporal and vertical alias which is present in a video signal. Thus, simple linear interpolation produces unwanted artefacts in the resulting picture, in particular, the pictures are blurred vertically and judder temporally.

To reduce these problems it has been proposed that video standards converters should use adaptive techniques to switch the parameters of a linear interpolator in dependence on the degree of movement in the picture represented by the incoming video signal.

It has also been proposed, for example for the purpose of data reduction in video signal processing, to generate motion vectors from an incoming video signal by a block matching technique, in which the content of a search block in one field or frame is compared with the respective contents of a plurality of search blocks comprised in a search area in the following field or frame, to determine the minimum difference between the contents so compared, and hence the direction and distance of motion (if any) of the content of the original search block.

A problem with such block matching techniques which has inhibited their application to video standards conversion is the difficulty in effecting the necessary large amount of processing in the time available.

SUMMARY OF THE INVENTION

One object of the present invention is to provide a motion compensated video standards converter using a block matching technique.

Another object of the present invention is to provide a method of deriving motion vectors by comparing blocks of pixels in an integrated circuit gate array.

Another object of the present invention is to provide a motion compensated video standards converter wherein blocks of pixels from progressive scan frames of a video signal are compared to derive motion vectors.

According to the present invention there is provided a motion compensated video standards converter comprising:

means for comparing blocks in a first progressive scan frame of a video signal with a plurality of blocks in the following progressive scan frame of the video signal for deriving motion vectors representing the motion of the content of respective said blocks between said first frame and said following frame; and an interpolator controlled in dependence on said motion vectors.

According to the present invention there is also provided a motion compensated video standards converter comprising:

comparator means to which are serially supplied digital pixel luminance data of a first field or frame of a video signal and of the following field or frame of the video signal, said comparator means comparing the luminance content of blocks in said first field or frame with a plurality of blocks in said following field or frame for deriving motion vectors representing the motion between said fields or frames; and an interpolator controlled in dependence on said motion vectors.

According to the present invention there is also provided a method of deriving motion vectors representing motion between successive fields or frames of a video signal, the method including comparing blocks in a first field or frame of the video signal with a plurality of blocks in the following field or frame of the video signal in an integrated circuit gate array for deriving said motion vectors representing the motion of the content of respective said blocks between said first field or frame and said following field or frame.

The above, and other objects, features and advantages of this invention will be apparent from the following detailed description of illustrative embodiments which is to be read in connection with the accompanying drawings.

BRIEF DESCRIPTION OF THE DRAWINGS

FIG. 11 shows diagrammatically the creation of pixels in missing lines in progressive scan conversion;

FIGS. 12A, 12B and 13 show diagrammatically search blocks and search areas, and the relationships therebetween;

FIGS. 18, 19A and 19B show diagrammatically how a search block is grown;

FIG. 20 shows the areas of a frame in which search block matching is not possible;

FIGS. 21A and 21B show diagrammatically a moving object straddling three search blocks;

FIG. 31 shows the relationship between sample blocks and search blocks, and a frame of video;

FIG. 32 shows motion vector regions in a frame of video;

FIGS. 33 to 35 show diagrams used in explaining motion vector reduction in respective regions of a frame of video;

FIGS. 38 and 39 show diagrammatically how a threshold is established during the motion vector selection;

FIG. 40 shows diagrammatically a second stage in motion vector selection;

DESCRIPTION OF THE PREFERRED EMBODIMENTS

The embodiment of motion compensated video standards converter to be described is particularly intended for use in the conversion of a high definition video signal (HDVS) having 1125 lines per frame, 60 fields per second, to 24 frames per second 35 mm film. However, it will be understood that the invention is not limited in this respect, and that the standards converter can readily be adapted to effect conversions between other standards.

Figure 1:
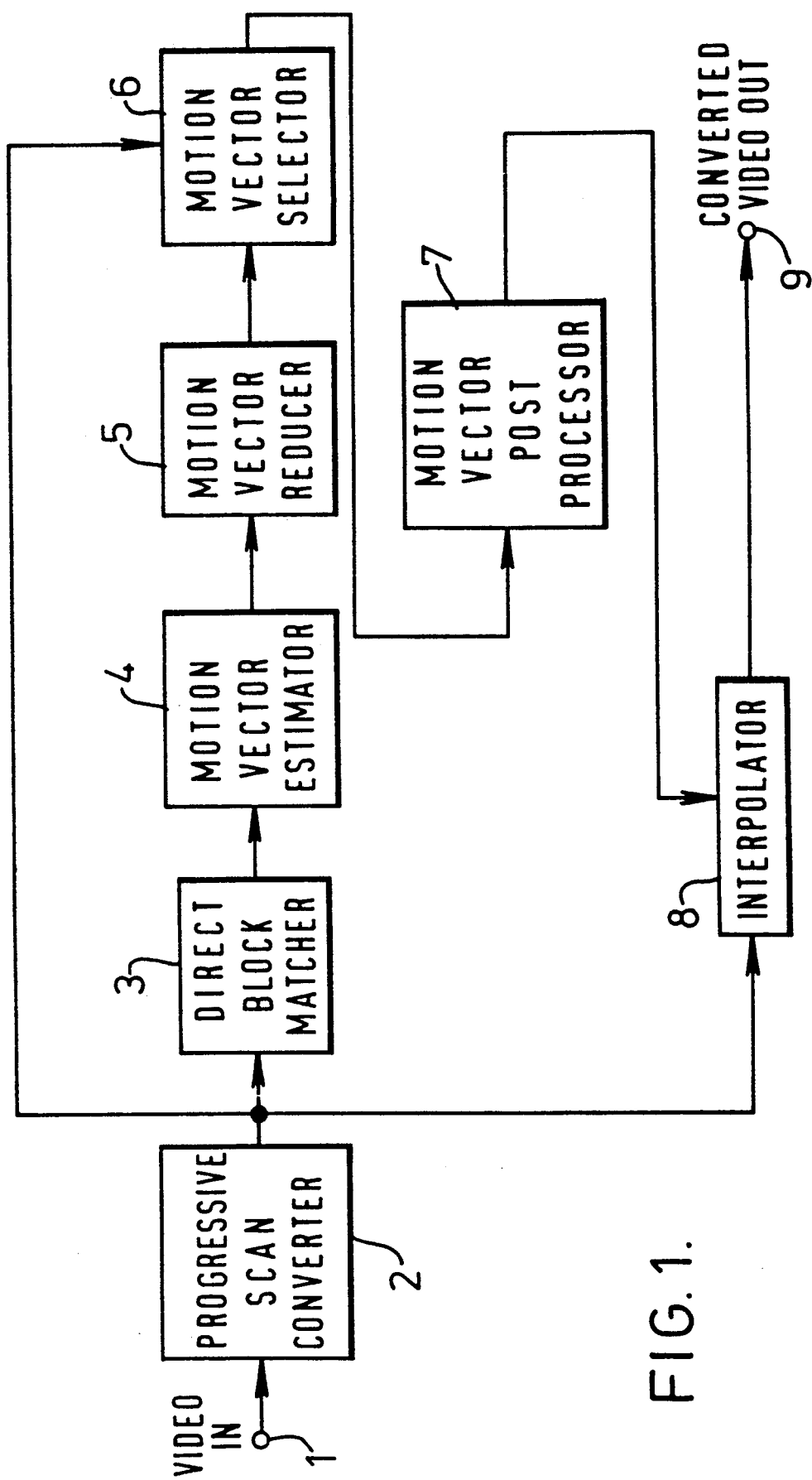
FIG. 1 is a block diagram of an embodiment of motion compensated video standards converter according to the present invention.

FIG. 1 is a block diagram of the standards converter. The standards converter comprises an input terminal 1 to which an input video signal is supplied. The input terminal is connected to a progressive scan converter 2 in which the input video fields are converted into video frames which are supplied to a direct block matcher 3 wherein correlation surfaces are created. These correlation surfaces are analysed by a motion vector estimator 4, which derives and supplies motion vectors to a motion vector reducer 5, wherein the number of motion vectors for each pixel is reduced, before they are supplied to a motion vector selector 6, which also receives an output from the progressive scan converter 2. Any irregularity in the selection of the motion vectors by the motion vector selector 6 is removed by a motion vector post processor 7, from which the processed motion vectors are supplied to and control an interpolator 8 which also receives an input from the progressive scan converter 2. The output of the interpolator 8, which is a standards-converted and motion-compensated video signal is supplied to an output terminal 9. Each part of the standards converter and the operation thereof will be described in more detail below.

Figure 2:
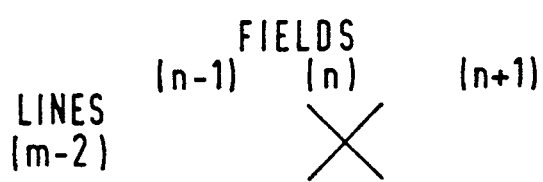
FIG. 2 shows diagrammatically progressive scan conversion.
Figure 2:
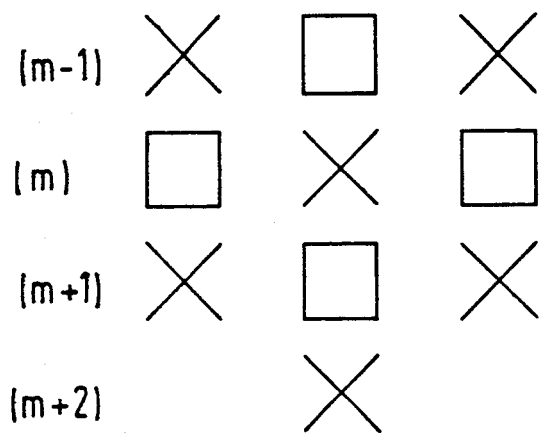

The progressive scan converter 2 produces output frames at the same rate as the input fields. Thus, referring to FIG. 2 which shows a sequence of consecutive lines in a sequence of consecutive fields, the crosses representing lines present in the input fields and the squares representing interpolated lines, each output frame will contain twice the number of lines as an input field, the lines alternating between lines from the input video signal and lines which have been interpolated by one of the methods to be described below. The interpolated lines can be regarded as an interpolated field of the opposite polarity to the input field, but in the same temporal position.

Progressive scan conversion is preferably carried out, for two main reasons; firstly, to make the following direct block matching process easier, and secondly in consideration of the final output video format. These two reasons will now be considered in more detail.

Direct block matching is used to obtain an accurate estimation of the horizontal and vertical motion between two successive video fields, as described in more detail below. However, due to the interlaced structure of the video signal on which direct block matching is performed, problems can arise.

Figure 3:
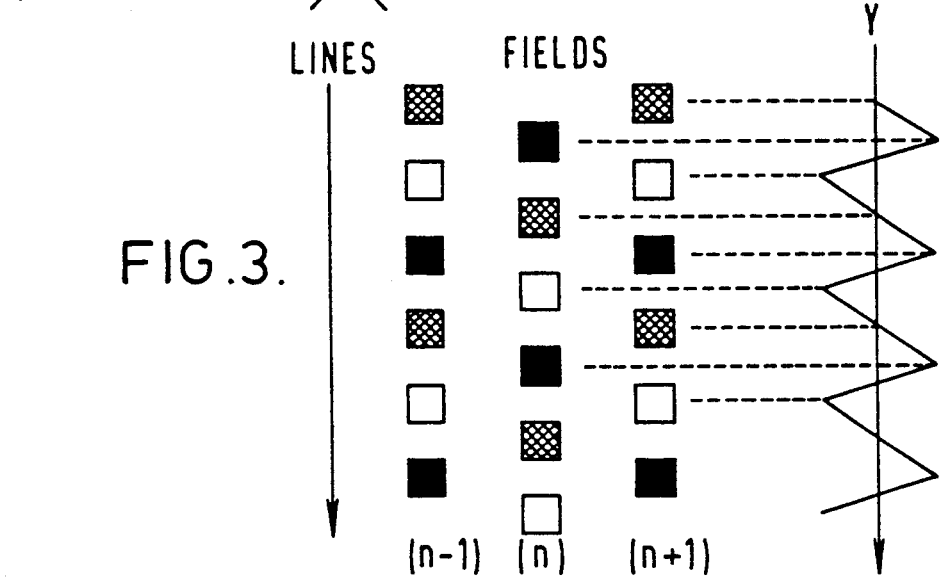
FIGS. 3 to 6 show diagrammatically sequences of lines in sequences of fields for explaining progressive scan conversion.
Figure 4:
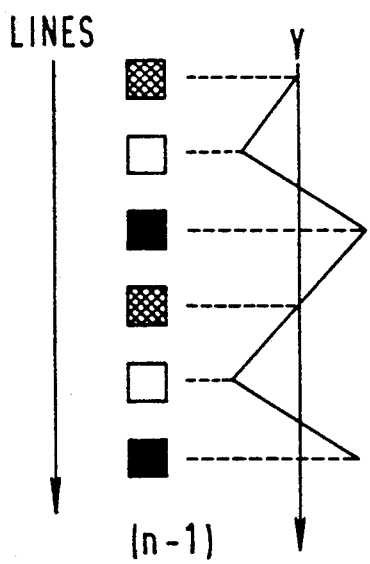
Figure 5:
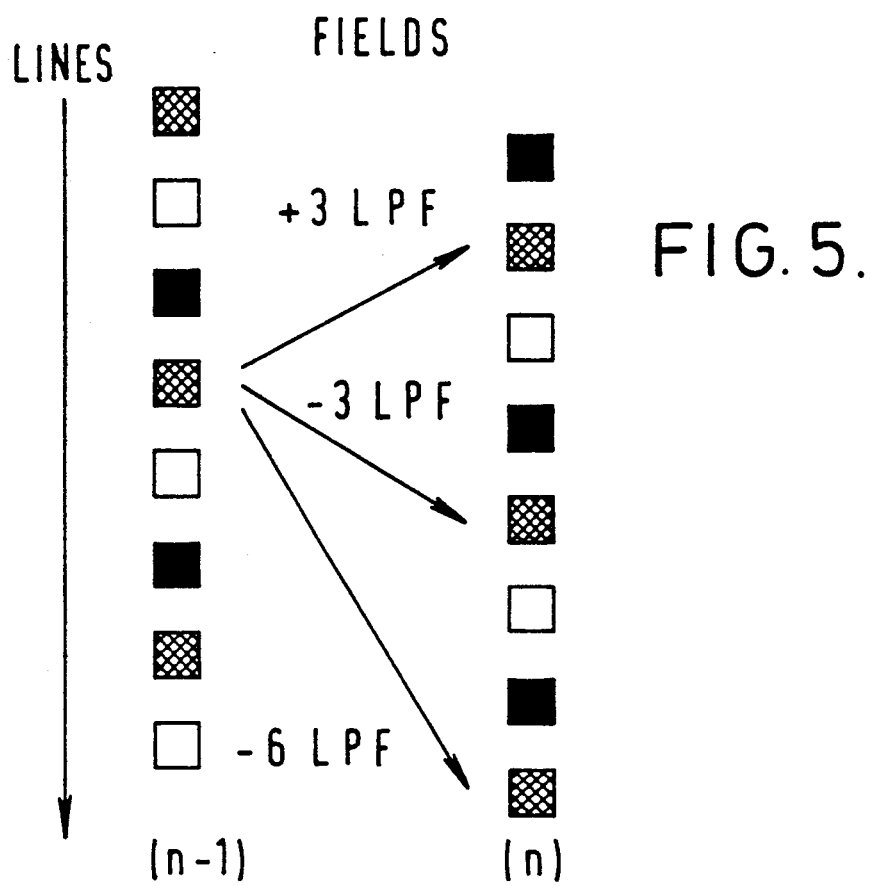

Consider the image represented by FIG. 3, which indicates a sequence of successive lines in a sequence of successive fields, the open squares representing white pixels, the black squares representing black pixels, and the hatched squares representing grey pixels. This, therefore, represents a static picture with a high vertical frequency component which in a HDVS would be 1125/3 cycles per picture height. As this image has been sampled by the usual interlace scanning procedure, each field appears to contain a static vertical frequency luminance component Y of 1125/6 cph, as indicated in FIG. 4. However, the frequency components in each field are seen to be in antiphase. Attempts to perform direct block matching between these two fields will lead to a number of different values for the vertical motion component, all of which are incorrect. This is indicated in FIG. 5, in which the abbreviation LPF means lines per field. From FIG. 5 it is clear that direct block matching will not give the correct answer for the vertical motion component, which component should in fact be zero. This is because the direct block matching is in fact tracking the alias component of the video signal rather than the actual motion.

Figure 6:
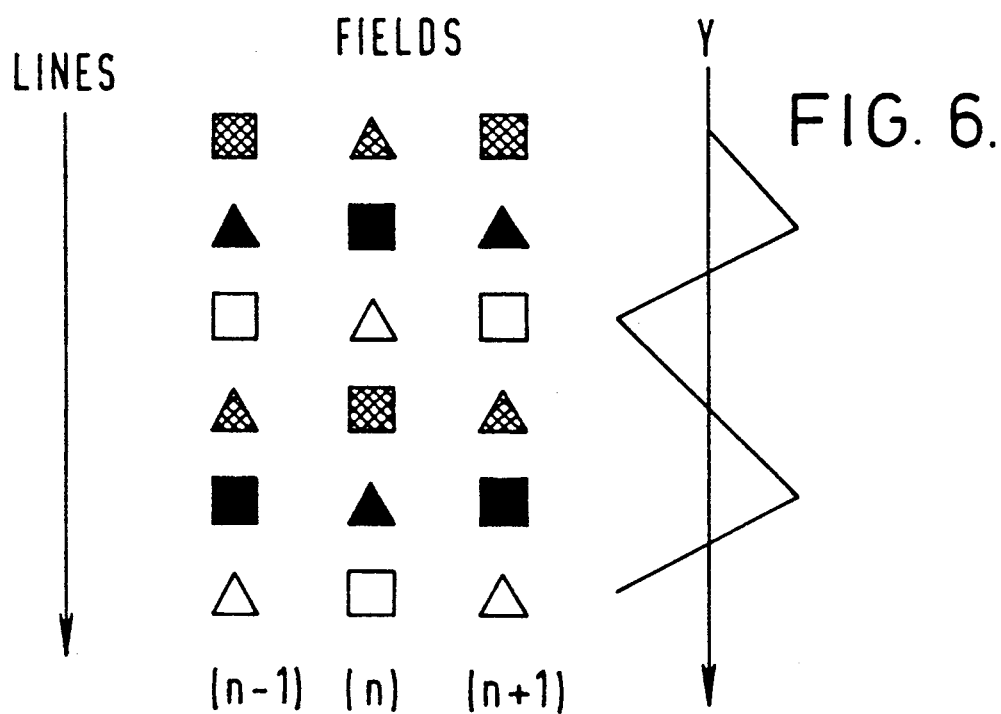

Consider now FIG. 6, which depicts the same static image as FIG. 3, except that now each input field has been progressive scan converted to form a frame, the triangles representing interpolated pixels. It can be seen that each frame now contains the same static vertical frequency component as the original input fields, that is 1125/3 cph. Thus, direct block matching between two successive frames can now give the correct value for the vertical motion, that is, zero, and the tracking of the vertical alias has been avoided. Moreover, there is the point that direct block matching on progressive scan converted frames will result in a more accurate vertical motion estimate, because the direct block matching is being performed on frames which have twice the number of lines.

Concerning consideration of the final output video format, in the case of the present embodiment, the converted video is supplied via tape to an electron beam recorder, and needs to consist of frames corresponding to the motion picture film rate of 24 frames per second. For this reason, therefore, the production of progressive scan converted frames is necessary, and moreover the progressive scan converted frames can also be used as a fall-back in the case where motion compensated standards conversion is deemed to be producing unacceptable results, for example, where the motion is too diverse to be analysed satisfactorily. In that case the use of the nearest progressive scan converted frame as the required output frame can produce reasonably acceptable results.

Figure 7:
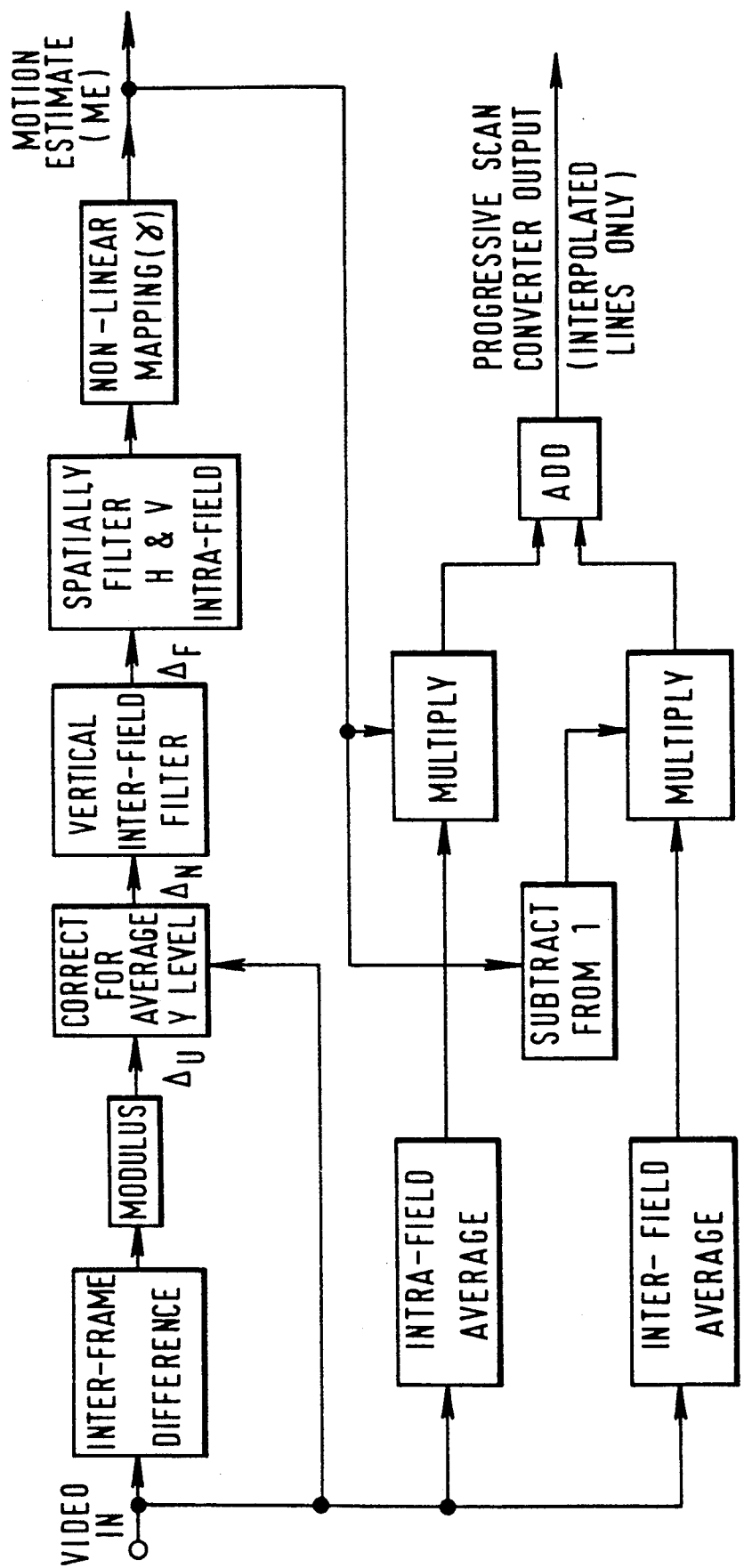
FIG. 7 is a block diagram showing the steps in motion adaptive progressive scan conversion.

Progressive scan conversion can be carried out in a number of ways, such as by previous field replacement, median filtering in which three spatially consecutive lines are examined (temporally these three lines will come from two consecutive fields), or a motion compensated technique which utilizes multi-gradient motion detection followed by multi-direction linear interpolation. However, in the present embodiment the preferred method is motion adaptive progressive scan conversion, the steps of which are indicated in the block diagram of FIG. 7. The concept is to use inter-field interpolation in wholly static picture areas to retain as much vertical information as possible, and to use intra-field interpolation when significant motion is present. This also aids smooth portrayal of motion. In scenes where the motion is somewhere between these two extremes, an estimate of the local motion present in the picture is made, and this is then used to mix together different proportions of inter- and intra-field interpolation.

Figure 8:
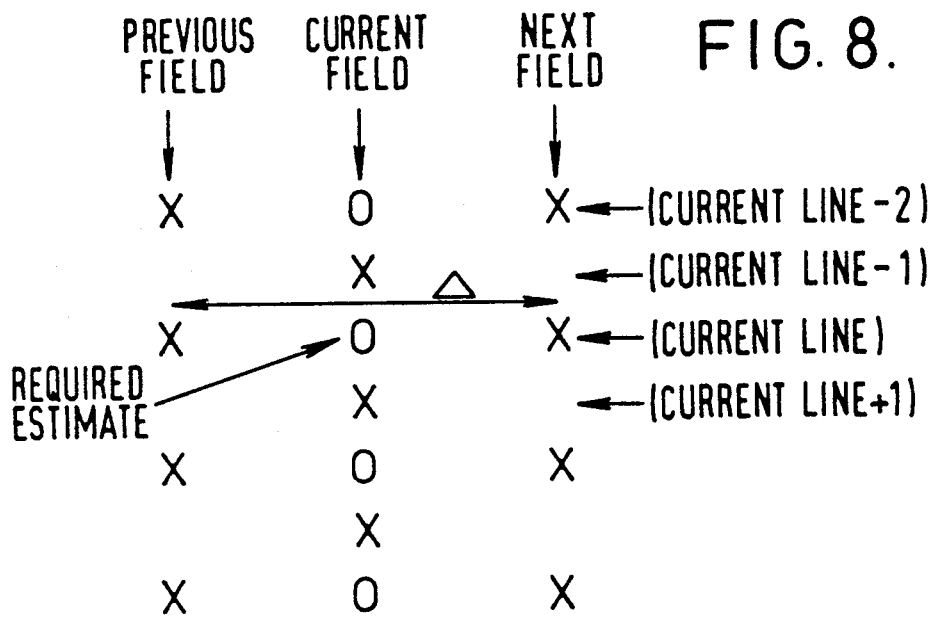
FIG. 8 shows diagrammatically progressive scanning, in particular the required estimate and difference value between successive fields.

In more detail, the modulus of the frame difference between previous and next fields is first generated, this being indicated in FIG. 8. To generate the required estimates, the modulus inter-frame difference array from the previous and the next fields is generated at each point:

$$\Delta_U(\text{pixel, current line, current field}) =$$

$$| Y(\text{pixel, current line, next field}) -$$

$$Y(\text{pixel, current line, previous field}) |$$

where:
$\Delta_U$ is the unnormalized modulus difference array, and Y is the luminance array corresponding to the 3D picture.

Figure 9:
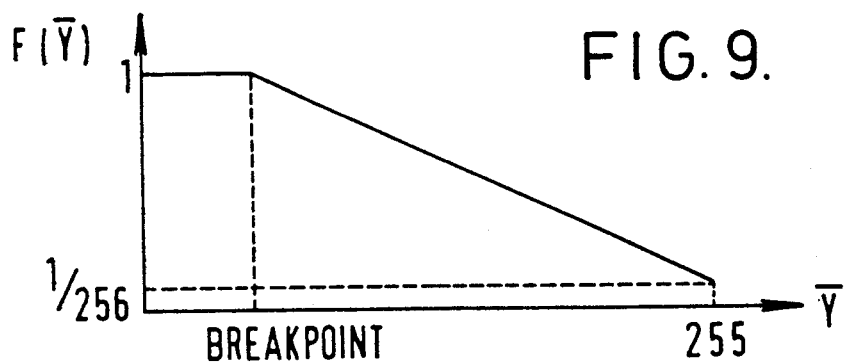
FIGS. 9 and 10 are diagrams used in explaining the technique of FIG. 8 in more detail, FIG. 9 showing a progressive scan normalizing function and FIG. 10 showing a progressive scan nonlinear function.

The modulus of difference is then normalized to adjust for the significance of changes in lower luminance areas:

$$\Delta_N(\text{pixel, current line, current field}) =$$

$$F(\overline{Y}(\text{pixel, current line})) * \Delta_U(\text{pixel, current line, current field})$$

where:
$\Delta_N$ is the normalized modulus difference array
$\overline{Y}$ is the inter-frame average luminance value
$\overline{Y}(\text{pixel, current line}) = (Y (\text{pixel, current line, previous field}) + Y(\text{pixel, current line, next field}))/2$, and $F(\overline{Y})$ (the normalizing function) is derived as indicated in FIG. 9.

The difference array $\Delta$ is then vertically filtered together with the previous field difference by a three-tap filter (examples of coefficients are a quarter, a half, a quarter or zero, unity, zero) to reduce vertical alias problems, and in particular to minimize the problems encountered with temporal alias. Thus:

$$\Delta_F(\text{pixel, current line, current field}) =$$

$$\Delta_N(\text{pixel, current line } - 1, \text{ previous field})*C_1 +$$

$$\Delta_N(\text{pixel, current line, current field})*C_2 +$$

$$\Delta_N(\text{pixel, current line } + 1, \text{ previous field})*C_1$$

where:
$\Delta_F$ is the filtered normalized difference array, and $C_1$ and $C_2$ are filter coefficients, and $2C_1+C_2=1$ so that unity dc gain is maintained.

A vertical and horizontal intra-field filter of up to five taps by fifteen taps is then used to smooth the difference values within the current field. In practice, a filter of three taps by three taps is satisfactory. Finally, in order to produce the actual motion estimation, a non-linear mapping function is applied using a function to provide the motion estimate (ME):

$$ME \text{ (pixel, current line)} = \gamma(\text{spatially filtered } \Delta_F \text{ (pixel, current line) })$$

Figure 10:
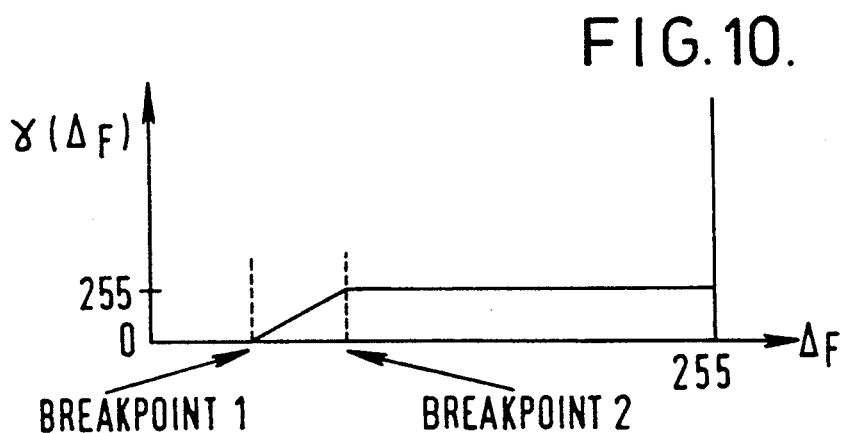

The non-linear function $\gamma$ is derived as shown in FIG. 10, the static picture ME is zero, for full motion ME is one, and for intermediate motions a controlled transition occurs.

To produce an interpolated pixel, the pixels in the missing line are created by taking proportions of the surrounding lines as indicated in FIG. 11. The motion estimate ME is then applied to the intra-frame interpolated value (generated from a two, four, six or preferably eight tap filter), and 1-ME is applied to the inter-field average (or alternatively to a more complex interpolated value), and these are summed to derive the progressive scan pixel estimate:

$$Y_{out}(\text{pixel, current line}) = ME(\text{pixel, current line}) *$$

$$\left\{ \sum_{n=0 \text{ to } 3} (Y_{in}(\text{pixel, current line } - 1 - 2n, \text{current field}) + Y_{in}(\text{pixel, current line } + 1 + 2n, \text{current field})) *C_n \right\} + (1 - ME)(\text{pixel, current line}) *$$

$$(Y_{in}(\text{pixel, current line, previous field}) + Y_{in}(\text{pixel, current line, next field}))/2$$

where: $C_0$, $C_1$, $C_2$ and $C_3$ are the intra-frame filter coefficients, and $2(C_0+C_1+C_2+C_3)=1$ so that unity dc gain is maintained.

This method of progressive scan conversion is found to produce high quality frames from input fields, in particular because a moving object can be isolated and interpolated in a different manner to a stationary background.

Referring back to FIG. 1, the frames of video derived by the progressive scan converter 2 are used to derive motion vectors. The estimation of motion vectors consists of two steps. Firstly, correlation surfaces are generated by correlating search blocks from consecutive frames. Then, having obtained these correlation surfaces, they have to be examined to determine the position or positions at which correlation is best. Several different methods of obtaining a correlation surface exist, the two main methods being phase correlation and direct block matching. There are, however, a number of problems associated with the use of phase correlation, these being very briefly problems relating to the transform mechanism, the windowing function, the block size and the variable quality of the contour of the surface produced. In the present embodiment, therefore, direct block matching is preferred.

Briefly, the direct block matcher 3, with which the present invention is particularly, but not exclusively, concerned, operates as follows. Two blocks, respectively comprising a rectangular array of pixels from consecutive frames of the progressive scan converted video signal are correlated to produce a correlation surface from which a motion vector is derived.

Figure 13:
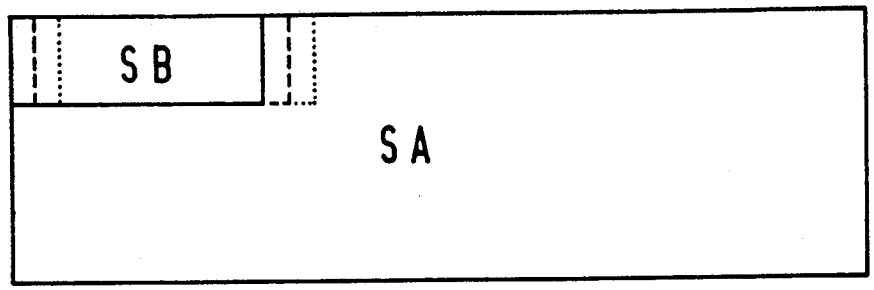
Figure 14:
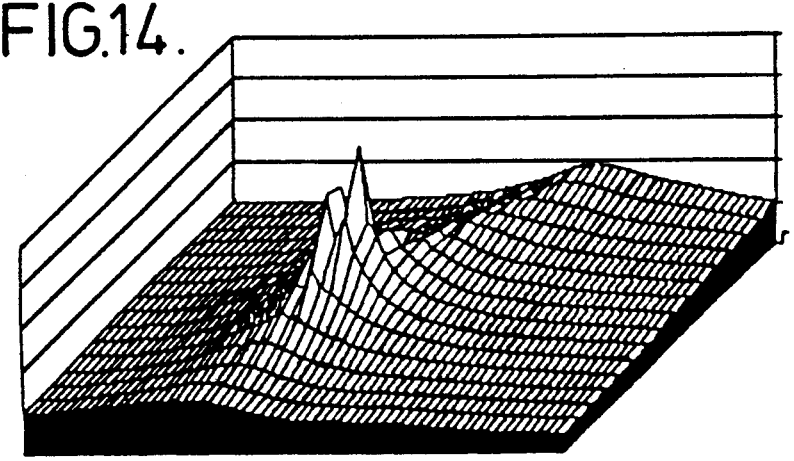
FIG. 14 shows a correlation surface.

Referring to FIGS. 12A and 12B, firstly a small block called a search block of size 32 pixels by 23 lines is taken from a frame as shown in FIG. 12A. Then a larger block called a search area of size 128 pixels by 69 lines is taken from the next frame, as shown in FIG. 12B. The search block (SB) is then placed in each possible position (96×46 positions in total) in the search area (SA) as shown in FIG. 13, and for each location the sum of the absolute difference of pixel luminance levels between the two blocks is calculated. This value is then used as the height of the correlation surface at the point at which it was derived. It can then be used in conjunction with other similarly derived values for each possible location of the search block in the search area to obtain a correlation surface, an example of which is shown in FIG. 14. For clarity the surface is shown inverted, and as it is in fact the minimum that is required, the required point in FIG. 14 is the main peak.

The size of the search block is selected by examining the minimum size of an object that may require motion compensation. For PAL625 lines per frame, 50 fields per second signals a search block of 16 pixels by 8 lines has been found suitable for tracking a small object without allowing any surrounding information not within the object, but still within the search block, to affect the tracking of the object. This approach has therefore been adopted in the present embodiment, bu modified to take account of the different numbers of active pixels per line, active lines per frame, and aspect ratio of a HDVS as compared with PAL 625/50. The comparative figures, the HDVS being put first, are as follows; 1920 (720) active pixels per line, 1035 (575) active lines per frame, 3:5.33 (3:4) aspect ratio.

Figure 15:
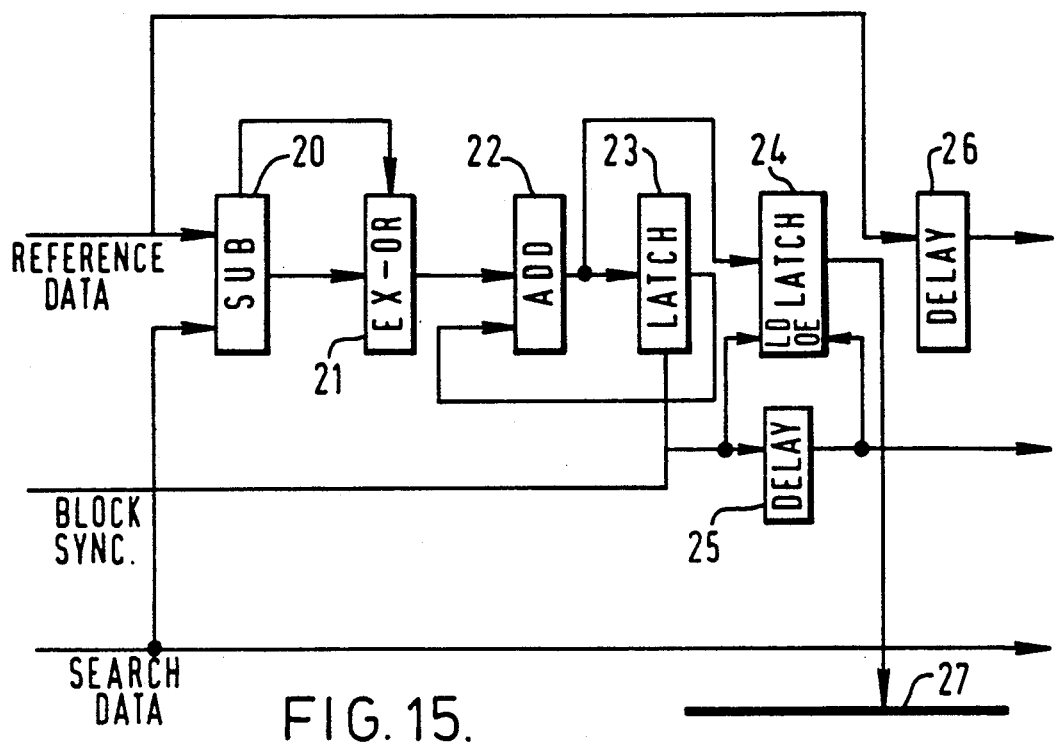
FIGS. 15 to 17 show parts of the embodiment in more detailed block diagrammatic form.
Figure 16:
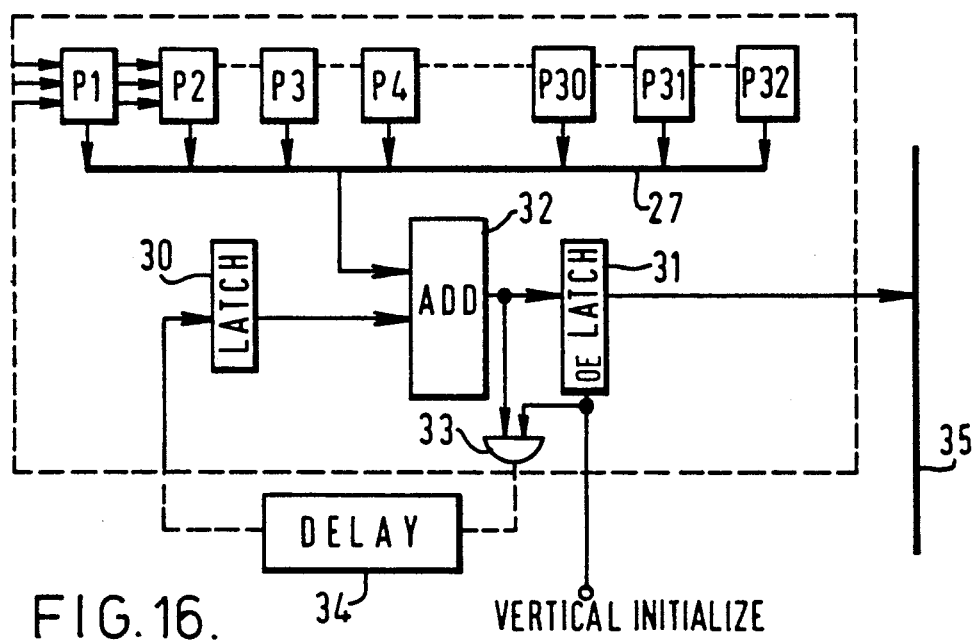
Figure 17:
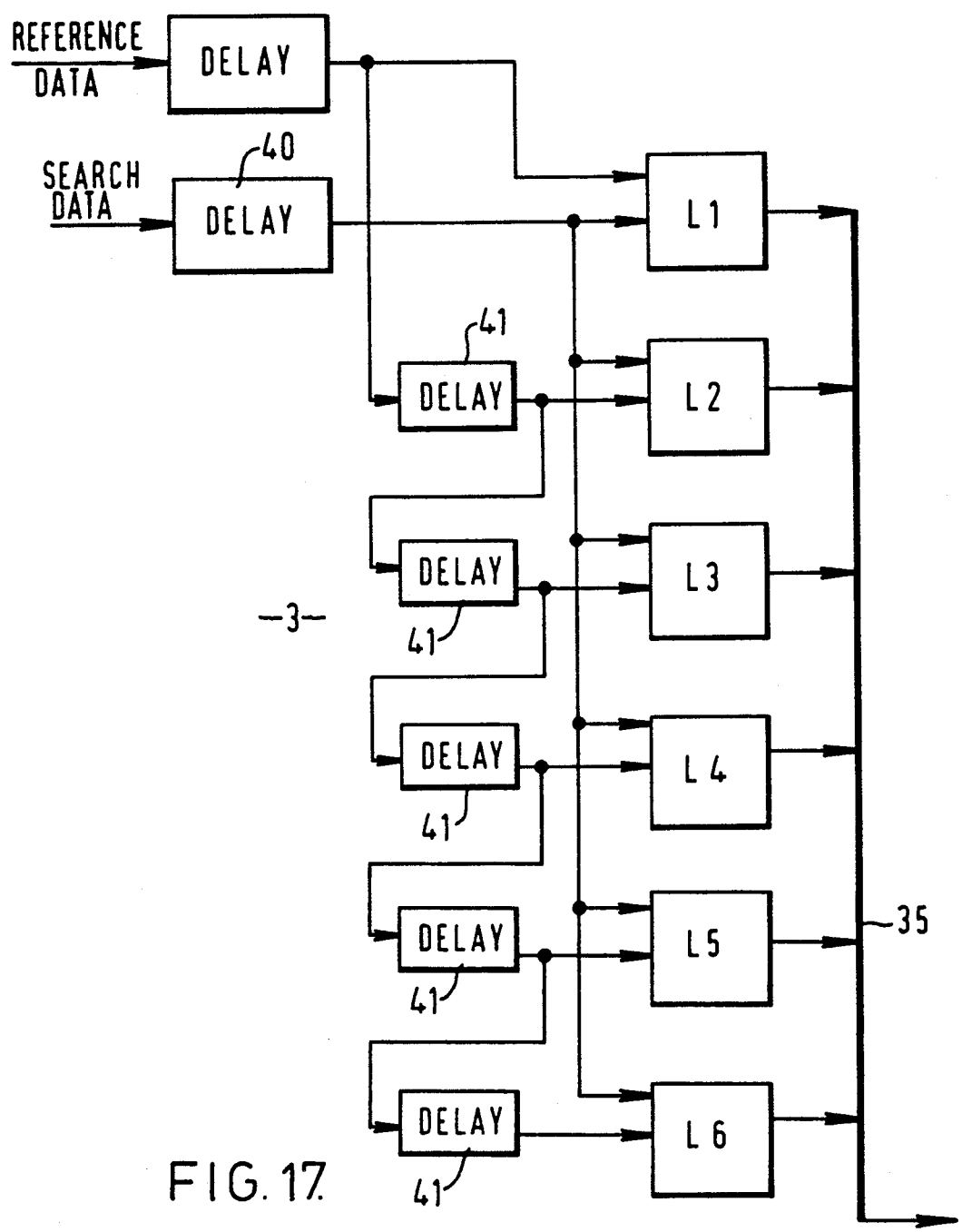

The direct block matcher 3 (FIG. 1) will now be described in more detail with reference to FIGS. 15 to 17. Broadly, it is configured in hardware as a series of gate arrays. Thus FIG. 15 shows a pixel accumulation circuit, a plurality (32) of which are comprised in a line accumulation circuit shown in FIG. 16, whilst a plurality (23) of the line accumulation circuits are comprised in the portion of the direct block matcher 3 (FIG. 1) shown in FIG. 17. The complete line accumulation circuit can readily be formed in a single gate array integrated circuit. The repetitive nature of the overall circuit arrangement helps simplify the gate array design.

The pixel accumulation circuit of FIG. 15 comprises a subtractor 20, an exclusive-OR gate 21, an adder 22, latch circuits 23 and 24, delays 25 and 26, and a horizontal bus 27, interconnected as shown and operating as will now be described. The reference data consists of serial pixel data from the current frame, that is the frame in which the search block is located. The data are thus a sequence, at an appropriate clock rate, of digital luminance sample values. The search data consists of similar serial pixel data, but from the following frame, that is the frame in which the search area is located. The subtractor 20 and the exclusive-OR gate 21 together derive the absolute (that is the modulus of the) difference of the pixel luminance levels, respective pair of pixels by respective pair of pixels, between the search block and the search area. The adder 22, the latch circuits 23 and 24, and the delay 25 together form an accumulator controlled by a block width (1/32 clock rate) synchronizing signal, so as to accumulate 32 absolute pixel luminance differences by successive additions, to form a sum which is loaded into the latch circuit 24 when a block synchronizing signal is supplied to its load (LD) terminal, and which is read out onto the horizontal bus 27 when, after a delay, the delay 25 supplies a signal to the output enable (OE) terminal of the latch circuit 24. The reference data are also supplied directly to the delay 26 to be passed on with a one pixel delay to the next pixel comparison array as will now become apparent.

The line accumulation circuit of FIG. 16 comprises 32 pixel accumulation circuits P1 to P32 each as shown in FIG. 15, latch circuits 30 and 31, an adder 32, an AND-gate 33, a delay 34 and an output bus 35, interconnected as shown and operating as will now be described. The pixel accumulation circuits P1 to P32 supply their respective outputs in multiplex to the horizontal bus 27, and the adder 32 and latch circuit 31 together form an accumulator for accumulating respective groups of these outputs over the vertical height of a search block, that is 23 lines. When a vertical initialize signal is supplied to the output enable (OE) terminal of the latch circuit 31 the accumulated output is supplied to the output bus 35. The accumulator is cleared down by a signal supplied from the AND-gate 33 to the delay 34, which is a line delay, and thence by way of the latch circuit 30 to the adder 32.

The portion of the direct block matcher 3 (FIG. 1) shown in FIG. 17 comprises 23 line accumulation circuits L1 to L23 each as shown within the broken line in FIG. 16, a search range (23 lines + 48 pixels) delay 40a, a group delay 40b, and 23 line delays 41, interconnected as shown, and operating as will now be described. As before, the reference data and the search data are supplied as shown, and are passed by the delays 40a and 40b respectively to the line accumulation circuit L1. The reference data are likewise supplied with delays increasing progressively by one line, to the succeeding line accumulation circuits L2 to L23, while the search data are supplied with the same delay (due to the delay 40a) to each of the line accumulation circuits L1 to L23. In this way there is multiplexed to the output bus 35 a group of 32×23 absolute pixel luminance differences. Six such groups make up the correlation surface for one search block, and six output buses 35 carry this information. The only difference in the manner of deriving the six groups is in the values of the delays 40a and 40b. The values of the delays are as follows, where L means lines and P means pixels:

| Group 1 | 40a:23L/48P | 40b:23L/64P |
| Group 2 | 40a:23L/48P | 40b:23L/32P |
| Group 3 | 40a:23L/48P | 40b:23L |
| Group 4 | 40a:23L/48P | 40b:64P |
| Group 5 | 40a:23L/48P | 40b:32P |
| Group 6 | 40a:23L/48P | 40b:0 |

It should be added that there is an argument for using a larger search block, since this means that a large object can be tracked. On the other hand, there exists an argument for using a smaller search block, to prevent a small object being over-shadowed by the effect of a large object or background area. Also, however, there is the advantage that with small search blocks there is no requirement for the derivation of more than one motion vector from each of them. Because having a single motion vector is so much easier than having more than one, the present embodiment starts with a small search block as described above, and then causes the search block to grow into a bigger search block if no satisfactory result has been obtained. This then encompasses the advantages of both a small and a large search block. The criteria for a satisfactory result is set by the motion vector estimator 4 (FIG. 1) referred to in more detail below and which determines the motion vector from a given correlation surface.

Figure 18:
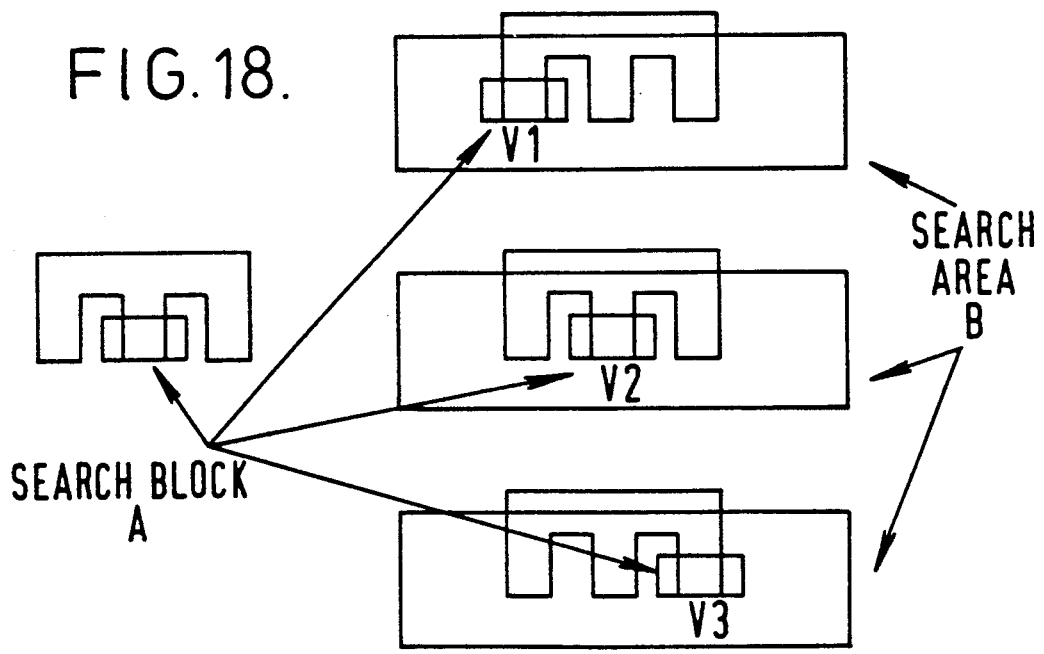

This technique of causing the search block to grow is not only advantageous for tracking large objects. It can also help to track the movement of an object having the shape of a regular pattern of a periodic nature. Thus, consider FIG. 18 where a search block A will match up with the search area B at locations V1, V2 and V3, with each of them giving a seemingly correct measure of motion. In this case, however, the motion vector estimation, that is the process that actually analyses the correlation surface, will show that good correlation occurs in three locations which are collinear. The search block will therefore be caused to grow horizontally until it is three times its original width, this being the direction in which multiple correlation occurred in this case. The search area will also be correspondingly horizontally enlarged. As shown in FIG. 19A, with the enlarged search block 3A, there is only a single correlation point, which correctly relates to the motion of the object.

In this particular case the search block and the search area (FIG. 19B) both have to grow horizontally, because the direction of multiple correlation is horizontal. It is equally possible, however, for the search block and the search area to grow vertically, or indeed in both directions, if the correlation surface suggests it.

It should be noted that block matching cannot be applied to all the search blocks in the frame, because in the border area there is not enough room from which a search area can be drawn. Thus, block matching cannot be effected in the border area of the frame shown hatched in FIG. 20. This problem is dealt with by the motion vector reducer 5 (FIG. 1) described in more detail below, which attempts to supply search blocks in this hatched area with appropriate motion vectors.

From the correlation surface (FIG. 17) generated for each search block in a frame the motion vector estimator 4 (FIG. 1) deduces the likely inter-frame motion between the search block and its corresponding search area. It should again be mentioned that for clarity all diagrams of correlation surfaces are shown inverted, that is, such that a minimum is shown as a peak.

The motion vector estimator 4 (FIG. 1) uses motion vector estimation algorithms to detect the minimum point on each correlation surface. This represents the point of maximum correlation between the search block and the search area, and hence indicates the probable motion between them. The displacement of this minimum on the correlation surface with respect to the origin, in this case the centre of the surface, is a direct measurement, in terms of pixels per frame, of the motion. For the simplest case, where the correlation surface contains a single, distinct minimum, the detection of the minimum point on the correlation surface is sufficient to determine accurately the motion between the search block and the search area. As previously mentioned, the use of small search blocks improves the detection of motion and the accuracy of motion estimation, but unfortunately small single search blocks are unable to detect motion in a number of circumstances which will now be described.

Figure 22:
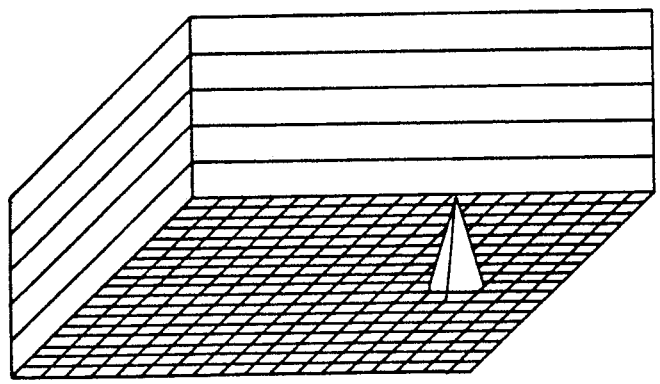
FIGS. 22 to 24 show three resulting correlation surfaces, respectively.
Figure 23:
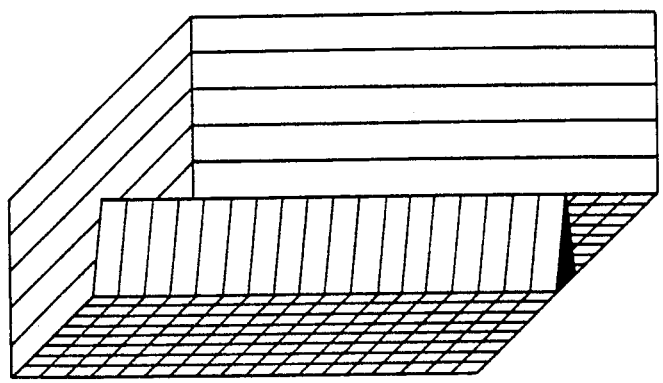

FIGS. 21A and 21B show an object with motion vectors (5, 0) straddling three search blocks 1A, 2A and 3A in a frame (t). When the search blocks 1A and 3A are correlated with respective search areas (1B and 3B) in the next frame (t+1) a correlation surface shown in FIG. 22 results showing a minimum at (5, 0). (This assumes a noiseless video source). However, when the search block 2A is correlated with its respective search area 2B, the correlation surface shown in FIG. 23 is produced, in which the search block 2A correlates with the search area 2B at every point in the y-axis direction. There is therefore no single minimum in the correlation surface, and hence the motion between the search block 2A and the search area 2B cannot be determined.

Figure 24:
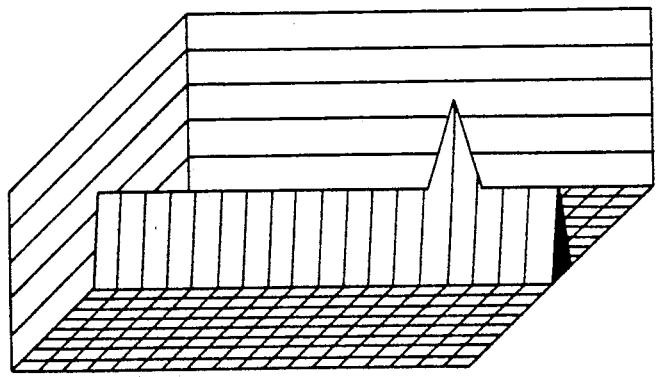

However, now consider the situation if the search block 2A is grown such that it encompasses all three of the original search blocks 1A, 2A and 3A. When the grown search block 2A is correlated with a search area covering the original search areas 1B, 2B and 3B, the resulting correlation surface is as shown in FIG. 24. This shows a single minimum at (5, 0) indicating the correct motion of the original search block 2A. This example illustrates the need for some unique feature in the source video, in order accurately to detect motion. Thus, the search blocks 1A and 3A both had unique vertical and horizontal features, that is the edges of the object, and hence motion could be determined. In contrast, the search block 2A had a unique vertical feature, but no unique horizontal feature, and hence horizontal motion could not be determined. However, by growing the search block until it encompasses a unique feature both horizontally and vertically, the complete motion for that search block can be determined. Moreover, it can be shown that growing the search block is beneficial when noise in the source video is considered.

Figure 25:
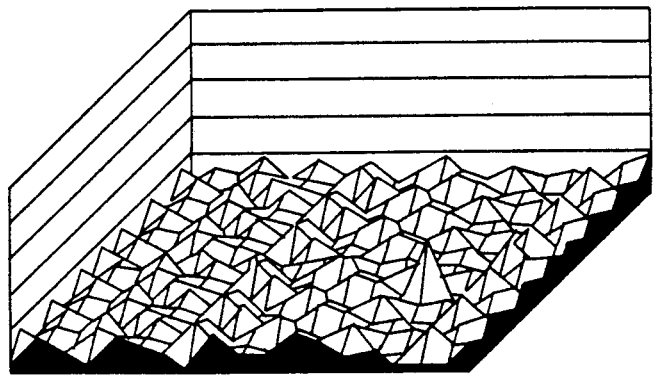
FIGS. 25 and 26 show further examples of correlation surfaces, used in describing a threshold test.
Figure 26:
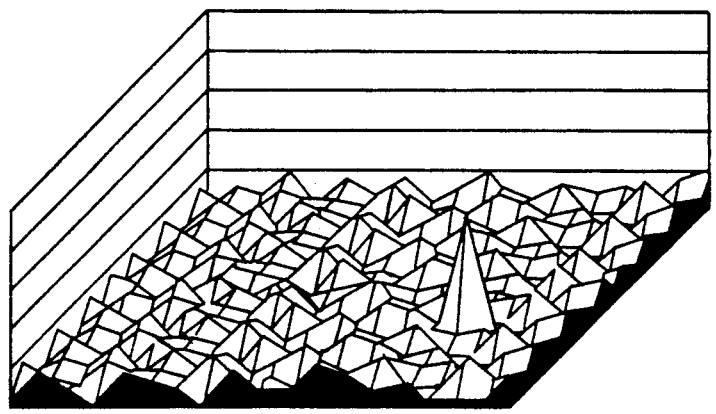

A further example will now be considered with reference to FIG. 25. This shows a correlation surface for a search block where the motion vector is (5, 3). However, due to the numerous other correlations which have taken place between the search block and the search area, the true motion is difficult to detect. An example of source video which might produce such a correlation surface would be a low contrast tree moving with the wind. It is now assumed that the search block and the search area are grown. The growing can take place in the horizontal direction, as in the previous example, or in the vertical direction, or in both directions. Assuming that the neighbouring search blocks have the same motion, the mean effect on the resulting correlation surface will be to increase the magnitude of the minima at (5, 3) by a greater proportion than the magnitude of the other correlation peaks. This is shown in FIG. 26, which indicates that it is then easier to detect the correct motion vector.

The way in which search blocks are grown will now be further considered with reference to FIG. 21. Here it was required to grow the area of the search block 2A to encompass the areas of the search blocks 1A and 3A, and to produce the resulting correlation surface. In fact, the resulting correlation surfaces are produced directly by adding together the elements of the three correlation surfaces corresponding to the search blocks 1A, 2A and 3A. In effect, if each correlation surface is considered as a matrix of point magnitudes, then the correlation surface of the enlarged search block 2A is the matrix addition of the correlation surface of the original search blocks 1A, 2A and 3A.

The area of the search block 2A could also be grown vertically by adding correlation surfaces of the search blocks above and below, whilst if the search block 2A is to be grown both horizontally and vertically, then the four neighbouring diagonal correlation surfaces have to be added as well. From this it will be seen that the actual process of growing a search block to encompass neighbouring search blocks is relatively easy, the more difficult process being to decide when growing should take place, and which neighbouring search blocks should be encompassed. Basically, the answer is that the area of the search blocks should be grown until a good minimum or good motion vector is detected. It is therefore necessary to specify when a motion vector can be taken to be a good motion vector, and this can in fact be deduced from the examples given above.

In the example described with reference to FIGS. 21 to 24, it was necessary to grow the search block horizontally in order to encompass a unique horizontal feature of the object, and hence obtain a single minimum. This situation was characterized by a row of identical minima on the correlation surface of FIG. 23, and a single minimum on the correlation surface of FIG. 24. From this the first criteria for a good minimum can be obtained; a good minimum is the point of smallest magnitude on the correlation surface for which the difference between it and the magnitude of the next smallest point exceeds a given value. This given value is known as the threshold value, and hence this test is referred to herein as the threshold test.

It should be noted that the next smallest point is prevented from originating from within the bounds of a further test, described below, and referred to herein as the rings test. In the case of a rings test employing three rings, the next smallest point is prevented from originating from a point within three pixels of the point in question. In the example of FIGS. 21 to 24, the correlation surface of FIG. 23 would have failed the threshold test; the search area 2A is therefore grown and, given a suitable threshold value, the correlation surface of FIG. 24 will pass the threshold test.

The threshold test can also be used to cause growing in the example described above with reference to FIGS. 25 and 26. Prior to growing the search block, the correct minimum is undetectable, due to the closely similar magnitudes of the surrounding points. Given a suitable threshold value, however, the correlation surface will fail the threshold test, and the search block will be grown. As a result, it will then be possible to detect the minimum among the other spurious points.

It will be seen that the use of a threshold is a subjective test, but the correct threshold for the correlation surface under test can be selected by normalizing the threshold as a fraction of the range of magnitudes within the correlation surface. This also lessens the effect of, for example the contrast of the video source.

Figure 27:
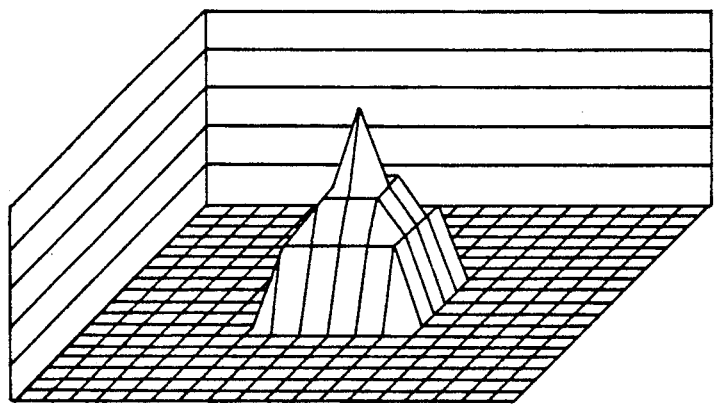
FIGS. 27 and 28 show still further examples of correlation surfaces, used in describing a rings test.
Figure 28:
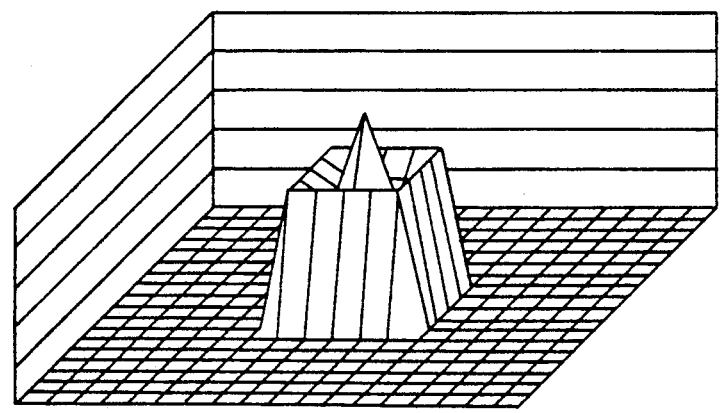

The rings test, referred to briefly above, and which is far less subjective, will now be further described. The basis of the rings test is to assume that a good minimum (or maximum) will have points of increasing (or decreasing) magnitudes surrounding it. FIG. 27 illustrates this assumption, showing a minimum at (0, 0) where the surrounding three rings of points have decreasing mean magnitude. This is as opposed to the correlation surface shown in FIG. 28, where the rings, and in particular the second inner-most ring, are not of decreasing mean magnitude.

In this case the criteria for a good minimum as defined by the rings test, is that the average slope is monotonic. Therefore for a pre-defined number of rings of points surrounding the minimum in question, the mean magnitude of each ring when moving from the inner-most ring outwards, must be greater than that of the previous ring. Returning again to the example described with reference to FIGS. 21 to 24 it will be seen from FIGS. 23 and 24 that the correlation surface of FIG. 23 would have failed the rings test, but that the correlation surface of FIG. 24 would have passed the rings test. Since the rings test compares mean, and not absolute, magnitudes, it is far less subjective than the threshold test, and indeed the only variable in the rings test is the number of rings considered.

Having described the mechanism for growing a search block, it is now necessary to consider how by examining the shape of the correlation surface it is possible to determine the most effective direction in which the search block should grow.

Referring again to FIG. 23, this correlation surface resulted where there was a unique vertical feature, but no unique horizontal feature. This is mirrored in the correlation surface by the minimum running horizontally across the correlation surface, due to the multiple correlations in this direction. From this it can be deduced that the search block should be grown horizontally. Conversely, should a line of multiple correlations run vertically, this would indicate the need to grow the search block vertically, whilst a circular collection of multiple correlations would indicate a need to grow the search block both horizontally and vertically.

Using this criteria, a quantative measure of the shape of the correlation surface is required in order to determine in which direction the search block should be grown. This measure is determined as follows. Firstly, a threshold is determined. Any point on the correlation surface below the threshold is then considered. This threshold, like that used in the threshold test, is normalized as a fraction of the range of magnitudes within the correlation surface. Using this threshold, the points on the correlation surface are examined in turn in four specific sequences. In each, the point at which the correlation surface value falls below the threshold is noted. These four sequences are illustrated diagrammatically in FIG. 29 in which the numbers 1, 2, 3 and 4 at the top, bottom, left and right refer to the four sequences, and the hatched area indicates points which fall below the threshold:

Sequence 1

Search from the top of the correlation surface down for a point A which falls below the threshold.

Sequence 2

Search from the bottom of the correlation surface up for a point C which falls below the threshold.

Sequence 3

Search from the left of the correlation surface to the right for a point D which falls below the threshold.

Sequence 4

Search from the right of the correlation surface to the left for a point B which falls below the threshold.

Figure 29:
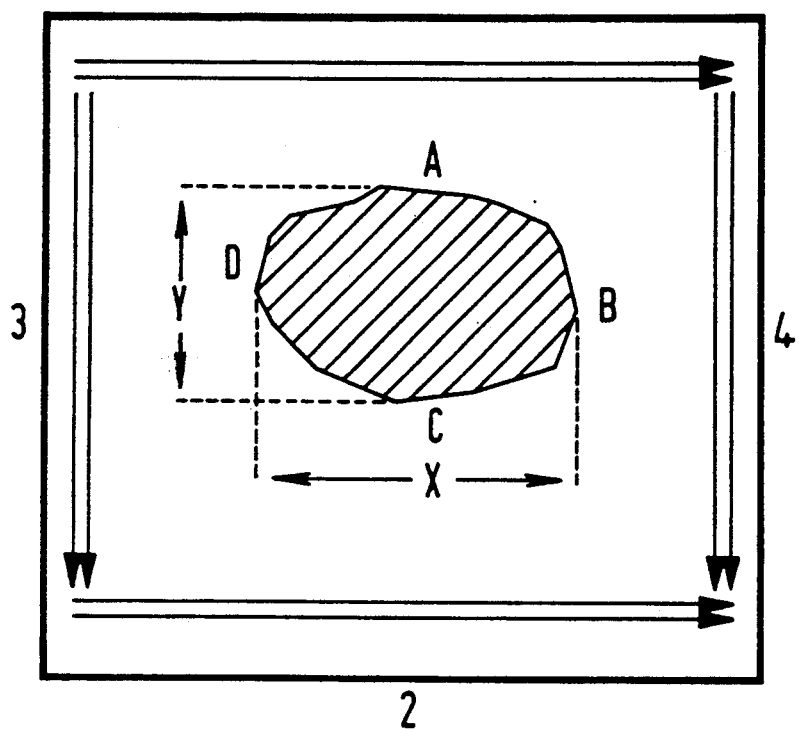
FIG. 29 shows diagrammatically how the direction in which a search block is to grow is determined.

The locations of the four resulting points A, B, C and D are used to calculate the two dimensions X and Y indicated in FIG. 29, these dimensions X and Y indicating the size of the hatched area containing the points falling below the threshold value. Hence from the dimensions X and Y, it can be deduced whether the shape is longer in the x rather than the y direction, or vice versa, or whether the shape is approximately circular. A marginal difference of say ten percent is allowed in deducing the shape, that is, the dimension X must be a minimum of ten percent greater than the dimension Y for the shape to be considered to be longer in the x direction. Similarly for the y direction. If the dimensions X and Y are within ten percent of each other, then the shape is considered to be circular, and the search block is grown in both directions. In the example of FIG. 29 the dimension X is greater than the dimension Y, and hence the search block is grown in the x or horizontal direction.

The growing of the search block continues until one or more growth limitations is reached. These limitations are: that the minimum in the correlation surface passes both the threshold test and the rings test; that the edge of the video frame is reached; or that the search block has already been grown a predetermined number of times horizontally and vertically. This last limitation is hardware dependent. That is to say, it is limited by the amount of processing that can be done in the available time. In one specific embodiment of apparatus according to the present invention, this limit was set at twice horizontally and once vertically.

If the minimum in the correlation surface passes both the threshold test and the rings test, then it is assumed that a good motion vector has been determined, and can be passed to the motion vector reducer 5 (FIG. 1). However, if the edge of the frame is reached or the search block has already been grown a predetermined number of times both horizontally and vertically, then it is assumed that a good motion vector has not been determined for that particular search block, and instead of attempting to determine a good motion vector, the best available motion vector is determined by weighting.

The correlation surface is weighted such that the selection of the best available motion vector is weighted towards the stationary, that is the centre, motion vector. This is for two reasons, firstly, if the search block, even after growing, is part of a large plain area of source video, it will not be possible to detect a good motion vector. However, since the source video is of a plain area, a stationary motion vector will lead to the correct results in the subsequent processing. Secondly, weighting is designed to reduce the possibility of a seriously wrong motion vector being passed to the motion vector reducer 5 (FIG. 1). This is done because it is assumed that when a good motion vector cannot be determined, a small incorrect motion vector is preferable to a large incorrect motion vector.

Figure 30A:
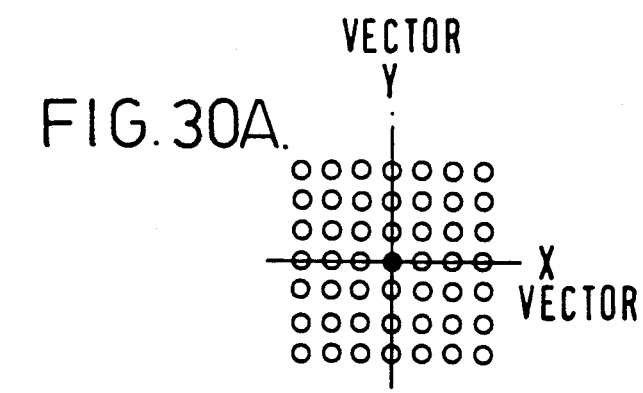
FIGS. 30A and 30B show diagrammatically how a correlation surface is weighted.
Figure 30B:
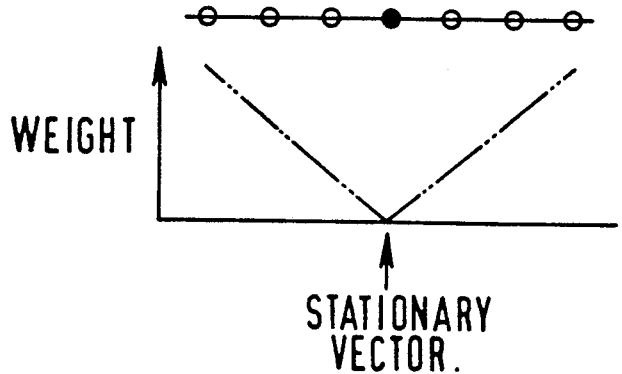

FIGS. 30A and 30B show an example of how the weighting function can be applied to the correlation surface. In this example, the weight applied to a given point on the correlation surface is directly proportional to the distance of that point from the stationary, centre motion vector. The magnitude of the point on the correlation surface is multiplied by the weighting factor. For example, the gradient of the weighting function may be such that points plus or minus 32 pixels from the centre, stationary motion vector are multiplied by a factor of three. In other words, as shown in FIG. 30B, where the centre, stationary motion vector is indicated by the black circle, the weighting function is an inverted cone which is centred on the centre, stationary motion vector.

After the correlation surface has been weighted, it is again passed through the threshold test and the rings test. If a minimum which passes both these tests is determined, then it is assumed that this is a good motion vector, and it is flagged to indicate that it is a good motion vector, but that weighting was used. This flag is passed, together with the motion vector to the motion vector reducer 5 (FIG. 1). If on the other hand, neither a good motion vector nor a best available motion vector can be determined, even after weighting, then a flag is set to indicate that any motion vector passed to the motion vector reducer 5 (FIG. 1) for this search block is a bad motion vector. It is necessary to do this because bad motion vectors must not be used in the motion vector reduction process, but must be substituted as will be described below.

Thus, in summary, the operation of the motion vector estimator 4 (FIG. 1) is to derive from the correlation surface generated by the direct block matcher 3 (FIG. 1), the point of best correlation, that is the minimum. This minimum is then subjected to the threshold test and the rings test, both of which the minimum must pass in order for it to be considered to represent the motion of the search block. It should, incidentally, be noted that the threshold used in the threshold test and the rings test may be either absolute values or fractional values. If the minimum fails either test, then the search block is grown, a new minimum is determined, and the threshold test and the rings test re-applied. The most effective direction in which to grow the search block is determined from the shape of the correlation surface.

Referring initially to FIG. 1, the process of motion vector reduction will now be described. Using a HDVS, each search block is assumed to be 32 pixels by 23 lines, which can be shown to lead to a possible maximum of 2451 motion vectors. The choice of the search block size is a compromise between maintaining resolution and avoiding an excessive amount of hardware. If all these motion vectors were passed to the motion vector selector 6, the task of motion vector selection would not be practicable, due to the amount of processing that would be required. To overcome this problem, the motion vector reducer 5 is provided between the motion vector estimator 4 and the motion vector selector 6. The motion vector reducer 5 takes the motion vectors that have been generated by the motion vector estimator 4 and presents the motion vector selector 6 with only, for example, four motion vectors for each search block in the frame, including those in border regions, rather than all the motion vectors derived for that frame. The effect of this is two-fold. Firstly, this makes it much easier to choose the correct motion vector, so long as it is within the group of four motion vectors passed to the motion vector selector 6. Secondly, however, it also means that if the correct motion vector is not passed as one of the four, then the motion vector selector 6 is not able to select the correct one. It is therefore necessary to try to ensure that the motion vector reducer 5 includes the correct motion vector amongst those passed to the motion vector selector 6. It should also be mentioned that although four motion vectors are passed by the motion vector reducer 5 to the motion vector selector 6, only three of these actually represent motion, the fourth motion vector always being the stationary motion vector which is included to ensure that the motion vector selector 6 is not forced into applying a motion vector representing motion to a stationary pixel. Other numbers of motion vectors can be passed to the motion vector selector 6, for example, in an alternative embodiment four motion vectors representing motion and the stationary motion vector may be passed.

Hereinafter the term 'sample block' refers to a block in a frame of video in which each pixel is offered the same four motion vectors by the motion vector reducer 5. Thus, a sample block is the same as a search block before the search block has been grown. As shown in FIG. 31, in a frame of video the initial positions of the sample blocks and the search blocks are the same.

The motion vector reducer 5 (FIG. 1) receives the motion vectors and the flags from the motion vector estimator 4 (FIG. 1) and determines the quality of the motion vectors by examining the flags. If the motion vector was not derived from an ambiguous surface, that is there is a high degree of confidence in it, then it is termed a good motion vector, but if a certain amount of ambiguity exists, then the motion vector is termed a bad motion vector. In the motion vector reduction process, all motion vectors classed as bad motion vectors are ignored, because it is important that no incorrect motion vectors are ever passed to the motion vector selector 6 (FIG. 1), in case a bad motion vector is selected thereby. Such selection would generally result in a spurious dot in the final picture, which would be highly visible.

Each of the motion vectors supplied to the motion vector reducer 5 (FIG. 1) was obtained from a particular search block, and hence a particular sample block (FIG. 31), the position of these being noted together with the motion vector. Because any motion vectors which have been classed as bad motion vectors are ignored, not all sample blocks will have a motion vector derived from the search block at that position. The motion vectors which have been classed as good motion vectors, and which relate to a particular search block, and hence a particular sample block, are called local motion vectors, because they have been derived in the area from which the sample block was obtained. In addition to this, another motion vector reduction process counts the frequency at which each good motion vector occurs, with no account taken of the actual positions of the search blocks that were used to derive them. These motion vectors are then ranked in order of decreasing frequency, and are called common motion vectors. In the worst case only three common motion vectors are available and these are combined with the stationary motion vector to make up the four motion vectors to be passed to the motion vector selector 6 (FIG. 1). However, as there are often more than three common motion vectors, the number has to be reduced to form a reduced set of common motion vectors referred to as global motion vectors.

A simple way of reducing the number of common motion vectors is to use the three most frequent common motion vectors and disregard the remainder. However, the three most frequent common motion vectors are often those three motion vectors which were initially within plus or minus one pixel motion of each other vertically and/or horizontally. In other words, these common motion vectors were all tracking the same motion with slight differences between them, and the other common motion vectors, which would have been disregarded, were actually tracking different motions.

In order to select the common motion vectors which represent all or most of the motion in a scene, it is necessary to avoid choosing global motion vectors which represent the same motion. Thus, the strategy actually adopted is first to take the three most frequently occurring common motion vectors and check to see if the least frequent among them is within plus or minus one pixel motion vertically and/or plus or minus one pixel motion horizontally of either of the other two common motion vectors. If it is, then it is rejected, and the next most frequently occuring common motion vector is chosen to replace it. This process is continued for all of the most frequently occurring common motion vectors until there are either three common motion vectors which are not similar to each other, or until there are three or less common motion vectors left. However, if there are more than three common motion vectors left, then the process is repeated this time checking to see if the least frequent among them is within plus or minus two pixel motion vertically and/or plus or minus two pixel motion horizontally of another, and so on at increasing distances if necessary. These three common motion vectors are the required global motion vectors, and it is important to note that they are still ranked in order of frequency.

When considering the motion vector reduction process and the sample blocks of a frame of video, it is necessary to look at three different types of sample blocks. These types are related to their actual position in a frame of video, and are shown in FIG. 32 as regions. Region A comprises sample blocks which are totally surrounded by other sample blocks and are not near the picture boundary. Region B contains sample blocks which are partially surrounded by other sample blocks and are not near the picture boundary. Finally, region C contains sample blocks which are near the picture boundary. The motion vector reduction algorithm to be used for each of these regions is different. These algorithms will be described below, but firstly it should be reiterated that there exist good motion vectors for some of the sample blocks in the frame of video, and additionally there are also three global motion vectors which should represent most of the predominant motion in the scene. A selection of these motion vectors is used to pass on three motion vectors together with the stationary motion vector for each sample block.

FIG. 33 illustrates diagrammatically motion vector reduction in the region A. This is the most complex region to deal with, because it has the largest number of motion vectors to check. FIG. 33 shows a central sample block which is hatched, surrounded by other sample blocks a to h. Firstly, the locally derived motion vector is examined to see if it was classed as a good motion vector. If it was, and it is also not the same as the stationary motion vector, then it is passed on. However, if it fails either of these tests, it is ignored. Then the motion vector associated with the sample block d is checked to see if it was classed as a good motion vector. If it was, and if it is neither the same as any motion vector already selected, nor the same as the stationary motion vector, then it too is passed on. If it fails any of these tests then it too is ignored. This process then continues in a similar manner in the order e, b, g, a, h, c and f. As soon as three motion vectors, not including the stationary motion vector, have been obtained, then the algorithm stops, because that is all that is required for motion vector selection for that sample block. It is, however, possible for all the above checks to be carried out without three good motion vectors having been obtained. If this is the case, then the remaining spaces are filled with the global motion vectors, with priority being given to the more frequent global motion vectors.

Figure 34:
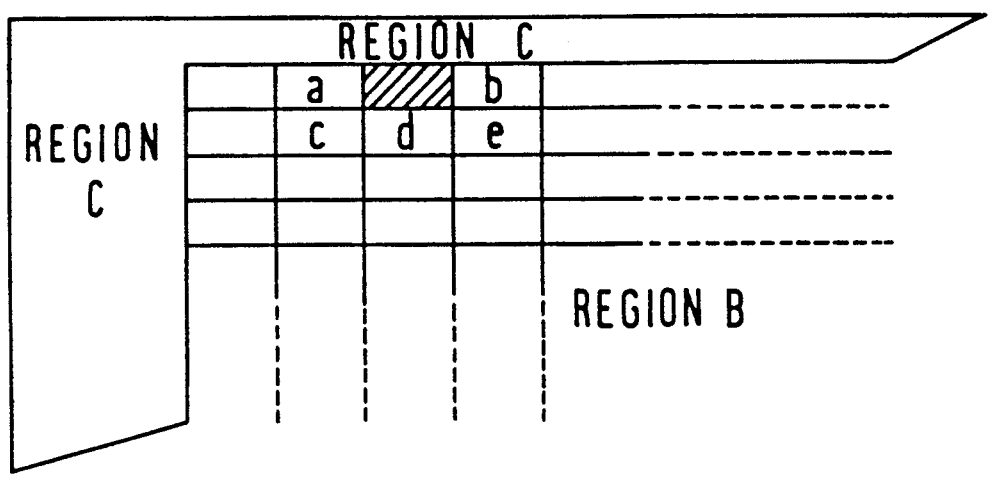

FIG. 34 illustrates motion vector reduction in the region B. Sample blocks in the region B are the same as those in the region A, except that they are not totally surrounded by other sample blocks. Thus the process applied to these sample blocks is exactly the same as those for the region A, except that it is not possible to search in all the surrounding sample blocks. Thus as seen in FIG. 34, it is only possible to check the motion vectors for the sample blocks a to e, and any remaining spaces for motion vectors are filled, as before, with global motion vectors. Likewise, if the hatched sample block in FIG. 34 were displaced two positions to the left, then it will be seen that there would only be three adjacent surrounding blocks to be checked before resorting to global motion vectors.

Figure 35:
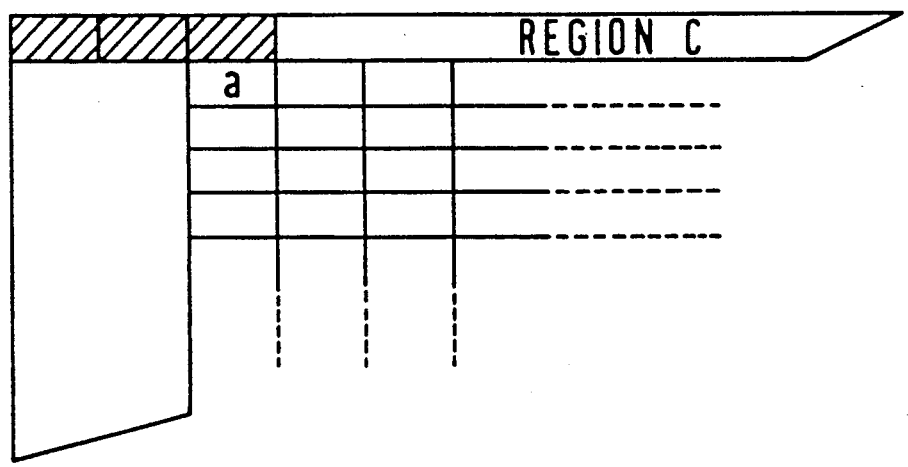

FIG. 35 illustrates motion vector reduction in the region C. This is the most severe case, because the sample blocks neither have a locally derived motion vector nor do they have many surrounding sample blocks whose motion vectors could be used. The simplest way of dealing with this problem is simply to give the sample blocks in the region C the global motion vectors together with the stationary motion vector. However, this is found to produce a block-like effect in the resulting picture, due to the sudden change in the motion vectors presented for the sample blocks in the region C compared with adjoining sample blocks in the region B. Therefore a preferred strategy is to use for the sample blocks in the region C the sample motion vectors as those used for sample blocks in the region B, as this prevents sudden changes. Preferably, each sample block in the region C is assigned the same motion vectors as that sample block in the region B which is physically nearest to it. Thus, in the example of FIG. 35, each of the hatched sample blocks in the region C would be assigned the same motion vectors as the sample block a in the region B, and this has been found to give excellent results.

Referring again to FIG. 1, the purpose of the motion vector selector 6 is to assign one of the four motion vectors supplied thereto to each individual pixel within the sample block. In this way the motion vectors can be correctly mapped to the outline of objects. The way in which this assignment is effected is particularly intended to avoid the possibility of the background surrounding fine detail from producing a better match than that produced by the correct motion vector. To achieve this the motion vector selection process is split into two main stages. In the first stage, motion vectors are produced for each pixel in the input frames. In other words, there is no attempt to determine the motion vector values for pixels at the output frame positions. The second stage uses the motion vector values produced by the first stage to determine the motion vector value for each pixel in the output frame.

Figure 36:
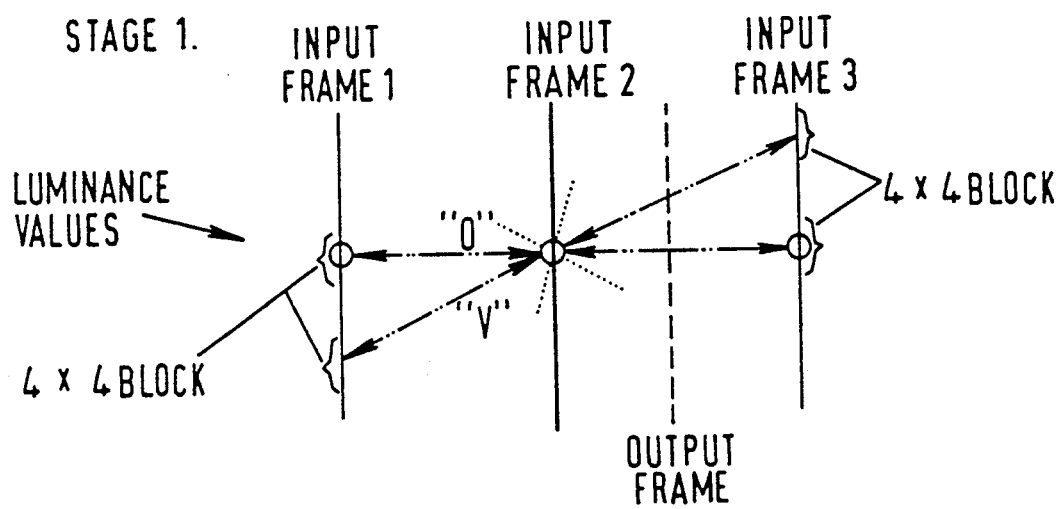
FIGS. 36 and 37 show diagrammatically a first stage in motion vector selection.

Referring now to FIG. 36, each pixel of the input frame 2 is tested for the best luminance value match with the previous and following input frames 1 and 3 of video data, using each of the four motion vectors supplied. The pixel luminance difference is determined as:

$$\sum_{m=0}^{4}\sum_{n=0}^{4}|P1_{nm}-P2_{nm}| + \sum_{m=0}^{4}\sum_{n=0}^{4}|P2_{nm}-P3_{nm}|$$

where:
$P1_{nm}$ is the luminance value of a frame 1 pixel within a $4\times4$ block of pixels surrounding the pixel whose location is obtained by subtracting the coordinates of the motion vector being tested from the location of the pixel being tested in frame 2

$P2_{nm}$ is the luminance value of a frame 2 pixel within a $4\times4$ block of pixels surrounding the pixel being tested $P3_{nm}$ is the luminance value of a frame 3 pixel within a $4\times4$ block of pixels surrounding the pixel whose location is obtained by adding the coordinates of the motion vector being tested to the location of the pixel being tested in frame 2

The minimum pixel difference then indicates the best luminance match and therefore the correct motion vector applicable to the pixel being tested. If the correct motion vector is not available, or there are uncovered or covered areas, referred to in more detail below, then a good match may not occur.

The indication of a poor match is achieved when the average pixel difference within the block of pixels being used is above a certain threshold. This threshold is important, because high frequency detail may produce a poor match even when the correct motion vector is tested. The reason for this poor match is the possibility of a half pixel error in the motion vector estimate. To determine what threshold should indicate a poor match, it is necessary to relate the threshold to the frequency content of the picture within the block of data which surrounds the pixel for which the motion vector is required. To achieve this, an auto-threshold value is determined where the threshold value equals half the maximum horizontal or vertical pixel luminance difference about the pixel being tested. To ensure that the threshold value obtained is representative of the whole block of data which is compared, an average value is obtained for the four central pixels of a $4\times4$ block used.

Figure 37:
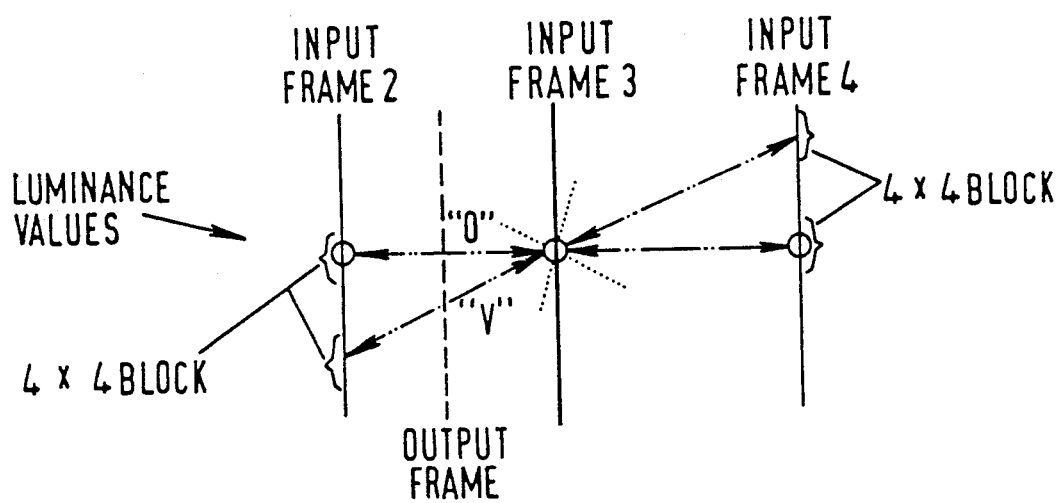

Referring to FIG. 38, which shows a $4\times4$ block, the required threshold value T is given by:

$$T=(T1+T2+T3+T4)/8$$

where T3, for example, is determined as indicated in FIG. 39 as equal to the maximum of the four pixel luminance difference values comprising:

the two vertical differences $|B2-B3|$ and $|B4-B3|$, and the two horizontal differences $|A3-B3|$ and $|C3-B3|$ In this way a frame of motion vectors is obtained for input frame 2, and in a similar manner a frame of motion vectors is obtained for input frame 3 as indicated in FIG. 37.

Apart from scene changes, it is the phenomenon of uncovered/covered surfaces that causes a mis-match to occur in the above first stage of motion vector selection. If an object, say a car, drives into a tunnel, then the car has become covered, while when it drives out, the car is uncovered. If the part of the car that was uncovered in frames 1 and 2 is covered in frames 3 and 4, then the basic vector selection process is not able to determine the correct vector. Moreover, whilst the car going into the tunnel becomes covered, the road and objects behind the car are being uncovered. Likewise the car leaving the tunnel is being uncovered, but the road and objects behind the car are being covered. In general therefore both covered and uncovered objects will exist at the same time. The end of a scene will also have a discontinuation of motion that is similar to an object becoming covered. In an attempt to determine a motion vector even in such circumstances, the luminance value block match is reduced to a two frame match, instead of the three frame match of FIGS. 36 and 37. The frame that the motion vectors are required for (say frame 2) is block-matched individually to the previous and the next frame (frame 1 and frame 3 respectively, in the case of frame 2), using the four motion vectors supplied. The motion vector which produces the best match is chosen as the motion vector applicable to the pixel being tested. In this case, however, a flag is set to indicate that only a two frame match was used.

Particularly with integrating type television cameras, there will be situations where no match occurs. If an object moves over a detailed background, then an integrating camera will produce unique portions of picture where the leading and trailing edges of the object are mixed with the detail of the background. In such circumstances, even the two frame match could produce an average pixel difference above the threshold value. In these cases the motion vector value is set to zero, and an error flag is also set.

The second stage of motion vector selection makes use of the two frames of motion vectors, derived by the first stage. One frame of motion vectors (input frame 2) is considered to be the reference frame, and the following frame to this (input frame 3) is also used. The output frame position then exists somewhere between these two frames of motion vectors. Referring to FIG. 40, for each output pixel position the four possible motion vectors associated with the sample block of input frame 2, are tested. A line drawn through the output pixel position at the angle of the motion vector being tested will point to a position on both the input frame 2 and the input frame 3. In the case of odd value motion vectors, for example, 1, 3 and 5, a point midway between two input frame pixels would be indicated in the case where the output frame is precisely half way between the input frames 1 and 2. To allow for this inaccuracy, and also to reduce the sensitivity to individual pixels, a 3×3 block of motion vectors is acquired for each frame, centred on the closest pixel position. In effect a block-match is then performed between each of the two 3×3 blocks of motion vectors and a block containing the motion vector being tested. The motion vector difference used represents the spatial difference of the two motion vector values as given by:

$$\sqrt{((x1 - x2)^2 + (y1 - y2)^2)}$$

where:
x1 and y1 are the Cartesian coordinates of the motion vector in one of the blocks
x2 and y2 are the Cartesian coordinates of the motion vector being tested An average vector difference per pixel is produced as a result of the block match.

A motion vector match is first produced as above using only motion vector values which were calculated using three input frames; that is, input frames 1, 2 and 3 for input frame 2 (FIG. 36), and input frames 2, 3 and 4 for input frame 3 (FIG. 37), and the result is scaled accordingly. Preferably there are at least four usable motion vectors in the block of nine. When both the motion vector block of frame 2 and frame 3 can be used, the motion vector difference values are made up of half the motion vector difference value from frame 2 plus half the motion vector difference value from frame 3. Whichever motion vector produces the minimum motion vector difference value using the above technique is considered to be the motion vector applicable to the output pixel being tested. If the motion vector difference value produced by the three frame match input motion vector (FIGS. 36 and 37) is greater than unity, then a covered or uncovered surface has been detected, and the same process is repeated, but this time ignoring the error flags. That is, the motion vector values which were calculated using two input frames are used. Theoretically this is only necessary for uncovered/covered surfaces, although in fact improvements can be obtained to the picture in more general areas.

If after both of the above tests have been performed, the minimum motion vector match is greater than two, the motion vector value is set to zero, and an error flag is set for use by the motion vector post processor 7 (FIG. 1).

Following motion vector selection, there will almost certainly be in any real picture situation, some remaining spurious motion vectors associated with certain pixels. FIGS. 41 to 46 show what are taken to be spurious motion vectors, and in each of these figures the triangles represent pixels having associated therewith the same motion vectors, whilst the stars represent pixels having associated therewith motion vectors different those associated with the surrounding pixels, and the circle indicates the motion vector under test.

Figure 41:
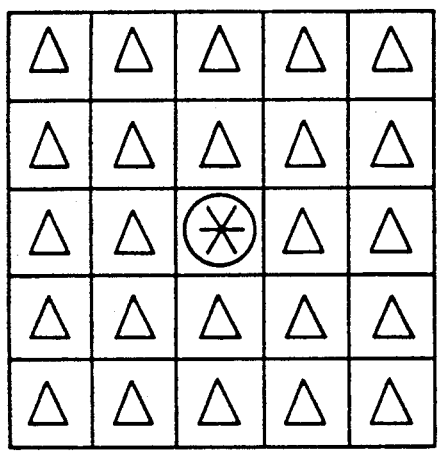
FIGS. 41 to 47 show arrays of pixels with associated motion vectors used in explaining motion vector post-processing.

FIG. 41 shows a point singularity where a single pixel has a motion vector different from those of all the surrounding pixels.

Figure 42:
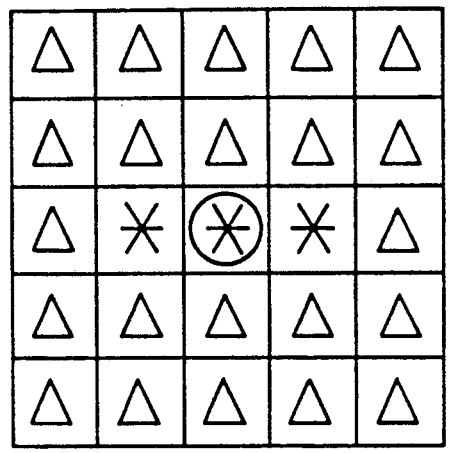

FIG. 42 shows a horizontal motion vector impulse, where three horizontally aligned pixels have a motion vector different from those of the surrounding pixels.

Figure 43:
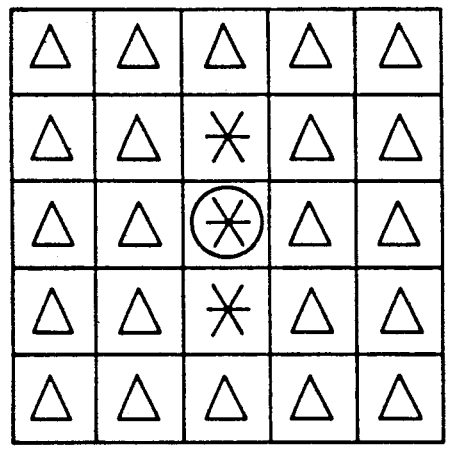

FIG. 43 shows a vertical motion vector impulse where three vertically aligned pixels have a motion vector different from those of the surrounding pixels.

Figure 44:
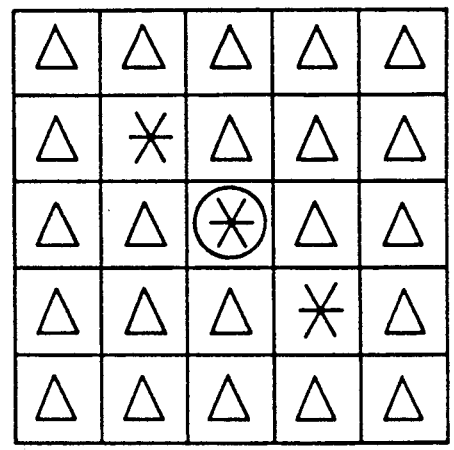

FIG. 44 shows a diagonal motion vector impulse where three diagonally aligned pixels have a motion vector different from those of all the surrounding pixels.

Figure 45:
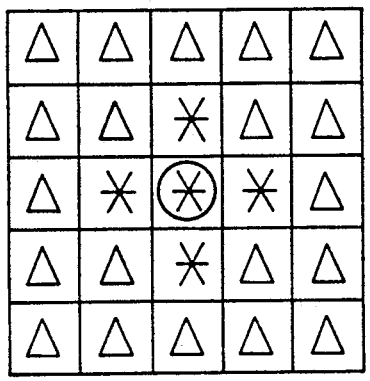

FIG. 45 shows a horizontal plus vertical motion vector impulse, where five pixels disposed in an upright cross have a motion vector different from those of all the surrounding pixels.

Figure 46:
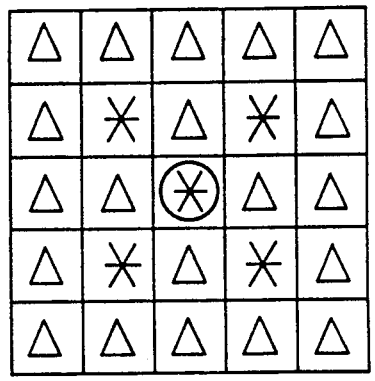

FIG. 46 shows a two-diagonal motion vector impulse where five pixels arranged in a diagonal cross have a motion vector different from those of all the surrounding pixels.

It is assumed that pixel motion vectors which fall into any of the above six categories do not actually belong to a real picture, and are a direct result in of an incorrect motion vector selection. If such motion vectors were used during the interpolation process, then they would be likely to cause dots on the final output picture, and it is therefore preferable that such motion vectors be identified and eliminated. This is done using an algorithm which will detect and flag all of the above motion vector groupings.

Figure 47:
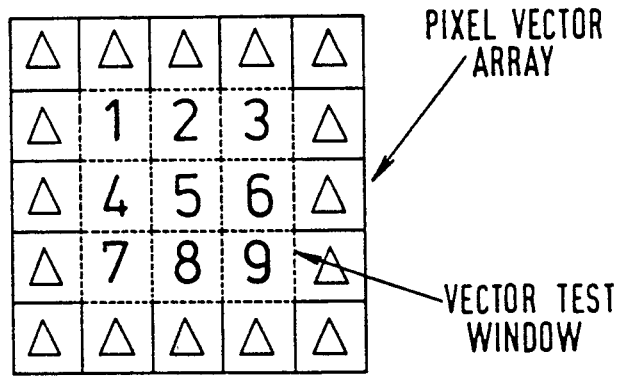

The algorithm uses a two-pass process, with each pass being identical. The need for two passes will become apparent. FIG. 47, to which reference is made, shows an array of pixels, all those marked with a triangle having the same motion vector associated therewith. The block of nine pixels in the centre has motion vectors designated vector 1 to vector 9 associated therewith, which motion vectors may or may not be the same. Vector 5 is the motion vector under test.

In the first pass, vector 5 is checked to determine whether it is the same as, or within a predetermined tolerance of:

firstly vector 1 or vector 3 or vector 7 or vector 9
and secondly vector 2 or vector 4 or vector 6 or vector 8

This checks to see if vector 5 is the same as at least one of its horizontal or vertical neighbours, and the same as at least one of its diagonal neighbours. If this is not the case, then a flag to set to indicate that pixel 5 is bad.

The first pass will flag as bad those motion vectors relating to point singularities, horizontal motion vector impulses, vertical motion vector impulses, diagonal motion vector impulses and two diagonal motion vector impulses (FIGS. 41 to 44 and 46), but not the motion vectors corresponding to horizontal plus vertical motion vector impulses (FIG. 45) for which pass 2 is required. The second pass checks for exactly the same conditions as in the first pass, but in this case motion vectors which have already been flagged as bad are not included in the calculation. Thus, referring to FIG. 45, after the first pass only the centre motion vector is flagged as bad, but after the second pass all five of the motion vectors disposed in the upright cross are flagged as bad.

Having identified the bad motion vectors, it is then necessary to repair them, this also being effected by the motion vector post processor 7 (FIG. 1). Although various methods such as interpolation or majority replacement can be used, it is has been found that in practice simple replacement gives good results. This is effected as follows (and it should be noted that the 'equals' signs mean not only exactly equal to, but also being within a predetermined tolerance of): If vector 5 is flagged as bad then it is replaced with:

vector 4 if (vector 4 equals vector 6)
else with vector 2 if (vector 2 equals vector 8)
else with vector 1 if (vector 1 equals vector 9)
else with vector 3 if (vector 3 equals vector 7)
else do nothing Referring again to FIG. 1, the finally selected motion vector for each pixel is supplied by the motion vector post processor 7 to the interpolator 8, together with the progressive scan converted frames at 60 frames per second from the progressive scan converter 2. The interpolator 8 is of relatively simple form using only two progressive scan converted frames, as indicated in FIG. 48. Using the temporal position of the output frame relative to successive input frames, frame 1 and frame 2, and the motion vector for the pixel in the output frame, the interpolator 8 determines in known manner which part of the first frame should be combined with which part of the second frame and with what weighting to produce the correct output pixel value. In other words, the interpolator 8 adaptively interpolates along the direction of movement in dependence on the motion vectors to produce motion compensated progressive scan frames corresponding to 24 frames per second. Although the motion vectors have been derived using only luminance values of the pixels, the same motion vectors are used for deriving the required output pixel chrominance values. An 8×8 array of pixels are used from each frame to produce the required output. Thus the interpolator 8 is a two-dimensional, vertical/horizontal, interpolator and the coefficients used for the interpolator 8 may be derived using the Remez exchange algorithm which can be found fully explained in 'Theory and Application of Digital Signal Processing', Lawrence R Rabiner, Bernard Gold. Prentice-Hall Inc., pages 136 to 140 and 227.

Figure 48A:
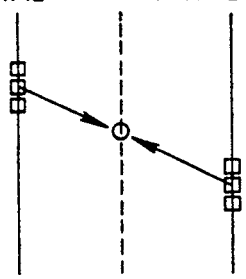
FIGS. 48A, 48B and 48C show diagrammatically the operation of an interpolator.
Figure 48B:
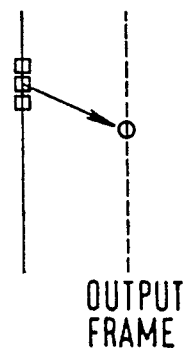
Figure 48C:
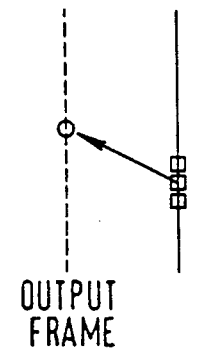

FIGS. 48A, 48B and 48C show diagrammatically the interpolation performed by the interpolator 8 (FIG. 1) for three different cases. The first case, shown in FIG. 48A, is where there are no uncovered or covered surfaces, the second case, shown in FIG. 48B, is where there is a covered surface, and the third case, shown in FIG. 48C, is where there is an uncovered surface. In the case of a covered surface, the interpolation uses only frame 1, whilst in the case of an uncovered surface, the interpolation uses only frame 2.

Provision can be made in the interpolator 8 to default to non-motion compensated interpolation, in which case the temporally nearest progressive scan converted frame is used.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A motion compensated video standards converter for converting an input video signal having a first standard format to a motion compensated video signal having a second standard format, said converter comprising:

progressive scan converter means for receiving said input video signal having said first standard format and for converting fields of said input video signal to video signal progressive scan frames;

comparator means coupled to said progressive scan converter means for comparing blocks in a first progressive scan frame of said video signal with a plurality of blocks in the following progressive scan frame of said video signal, said comparator means deriving motion vectors which represent the motion of the content of the respective blocks compared between said first frame and said following frame; and interpolator means for interpolating said scan frames from said progressive scan converter means in dependence on said motion vectors to produce said motion compensated video signal having said second standard format.

2. A motion compensated video standards converter as set forth in claim 1, in which said comparator means includes means for serially supplying digital pixel luminance data of the first frame and the following frame to a gate array means for continuous comparison of the luminance content of the respective blocks compared between said first frame and said following frame.

3. A motion compensated video standards converter as set forth in claim 1, in which each of said blocks in said first frame is a search block comprising a rectangular array of pixels having a luminance content, and in which said comparator means compares said luminance content of said search block with that of similar-sized blocks in each possible position in a search area in said following frame, said search area comprising a rectangular array of pixels and being larger than said search block.

4. A motion compensated video standards converter for converting an input video signal having a first standard format to a motion compensated video signal having a second standard format, said converter comprising:

progressive scan converter means for receiving said input video signal having said first standard format and for converting fields of said input video signal to progressive scan frames by motion adaptive line interpolating said fields of said input video signal;

comparator means coupled to said progressive scan converter means for serially receiving digital pixel luminance data of a first scan frame and of the following scan frame, said comparator means comparing the luminance content of blocks in said first scan frame with a plurality of blocks in said following scan frame for deriving motion vectors representing the motion between said first scan frame and said following scan frame; and interpolator means for interpolating said scan frames from said progressive scan converter means in dependence on said motion vectors to produce said motion compensated video signal having said second standard format.

5. A method of deriving motion vectors representing motion between respective contents of successive fields or frames of a video signal, said method including the steps of: comparing blocks in a first field or frame of said video signal with a plurality of blocks in the following field or frame of said video signal in integrated circuit gate array means and deriving said motion vectors in accordance with the comparison between said blocks in said first field or frame and said plurality of blocks in said following field or frame, said motion vectors representing said motion of the content of the respective blocks compared between said first field or frame and said following field or frame.

6. A method according to claim 5, in which said comparing step comparing comprises generating a correlation surface for the respective blocks in said first field or frame, said correlation surface representing the difference between the content of a block in said first field or frame and the content of each of said blocks in said following field or frame with which said block in said first field or frame has been compared, locating a minimum in said correlation surface, and deriving a motion vector corresponding to said minimum.

7. A method according to claim 5, in which each of said blocks in said first field or frame is a search block comprising a rectangular array of pixels having a luminance content, and in which said comparing step includes comparing the digital luminance content of said search block with that of similar-sized blocks in each possible position in a search area in said following field or frame, said search area comprising a rectangular array of pixels and being larger than said search block.

8. A method according to claim 5, in which said successive fields or frames are converted to progressive scan frames by motion adaptive line interpolating input fields of said video signal.

* * * * *